US011681273B2

(12) United States Patent
Burns

(10) Patent No.: US 11,681,273 B2
(45) Date of Patent: Jun. 20, 2023

(54) PID CONTROLLER FOR EVENT INGESTION THROTTLING

(71) Applicant: PagerDuty, Inc., San Francisco, CA (US)

(72) Inventor: Taavi Andrew Burns, Toronto (CA)

(73) Assignee: PagerDuty, Inc., San Francisco, CA (US)

( * ) Notice: Subject to any disclaimer, the term of this patent is extended or adjusted under 35 U.S.C. 154(b) by 0 days.

(21) Appl. No.: 17/444,141

(22) Filed: Jul. 30, 2021

(65) Prior Publication Data

US 2023/0032488 A1 Feb. 2, 2023

(51) Int. Cl.
*G05B 19/4155* (2006.01)

(52) U.S. Cl.
CPC .......... *G05B 19/4155* (2013.01); *G05B 2219/42033* (2013.01)

(58) Field of Classification Search
None
See application file for complete search history.

(56) References Cited

U.S. PATENT DOCUMENTS

| | | | | |
|---|---|---|---|---|
| 5,384,526 A | * | 1/1995 | Bennett | G05B 11/42 388/906 |
| 2003/0078065 A1 | * | 4/2003 | Hoagland | H04L 1/20 455/517 |
| 2003/0195650 A1 | * | 10/2003 | Danielson | G05D 7/0611 700/275 |
| 2004/0064204 A1 | * | 4/2004 | Frutiger | G05B 11/42 700/39 |

(Continued)

FOREIGN PATENT DOCUMENTS

| | | | | |
|---|---|---|---|---|
| CN | 105186626 A | * | 12/2015 | ............ H04L 45/74 |
| CN | 110266598 A | * | 9/2019 | ............ H04L 45/74 |

OTHER PUBLICATIONS

Berglund, Apache Kafka® 101: Partitioning, Confluent YouTube Channel, Nov. 23, 2020, Mountain View, CA, 4:22 minute video, https://www.youtube.com/watch?app=desktop&v=y9BStKvVzSs.

(Continued)

*Primary Examiner* — Mohammad Ali
*Assistant Examiner* — David Earl Ogg
(74) *Attorney, Agent, or Firm* — Young Basile Hanlon & MacFarlane, P.C.

(57) ABSTRACT

A method for event processing includes accepting for processing, as accepted events and according to a target rate limit, at least a subset of received events; associating respective ingested timestamps with the accepted events; associating respective processing completion timestamps with processed events of the accepted events; determining an average measured lag time using at least a subset of the respective processing completion timestamps and corresponding respective ingested timestamps; obtaining a throttled rate limit using a proportional-integral-derivative (PID) controller; and accepting subsequent events according to the throttled rate limit. The PID controller can be configured to use, as an input, an error value that is a difference between a target lag time and the average measured lag time. An integral part of the PID controller can be set to zero responsive to an accumulated average lag time being less than the target lag time.

20 Claims, 10 Drawing Sheets

(56) References Cited

U.S. PATENT DOCUMENTS

| | | | | |
|---|---|---|---|---|
| 2006/0221908 | A1* | 10/2006 | Hoshina | H04W 88/08 |
| | | | | 370/335 |
| 2015/0277964 | A1* | 10/2015 | Atkins | H04L 67/01 |
| | | | | 718/101 |
| 2016/0081097 | A1* | 3/2016 | Cho | H04W 24/02 |
| | | | | 370/329 |
| 2016/0125332 | A1* | 5/2016 | Moore | G06Q 10/06315 |
| | | | | 705/7.22 |
| 2019/0050317 | A1* | 2/2019 | Melville | G06F 11/3476 |
| 2019/0068671 | A1* | 2/2019 | Mehta | G06F 9/542 |
| 2020/0380262 | A1* | 12/2020 | Leung | H04L 65/765 |
| 2021/0117232 | A1* | 4/2021 | Sriharsha | G06F 16/256 |
| 2021/0117415 | A1* | 4/2021 | Sriharsha | G06F 17/16 |

OTHER PUBLICATIONS

MATLAB, Understanding PID Control Part 1: What is PID Control?, MATLAB by MathWorks YouTube Channel, May 22, 2018, 11:41 minute video, https://www.youtube.com/watch?app=desktop&v=wkfEZmsQqiA.

MATLAB, Understanding PID Control Part 2: Expanding Beyond A Simple Integral, MATLAB by MathWorks YouTube Channel, Jun. 5, 2018, 10:43 minute video, https://www.youtube.com/watch?app=desktop&v=NVLXCwc8HzM.

Burns, Elixir at PagerDuty: Faster Processing with Stateful Services, PagerDuty Blog, Jun. 23, 2020, 11 pages, https://www.pagerduty.com/eng/elixir-stateful-services/.

Wikipedia, PID Controller, Wikipedia, the free encyclopedia, latest edit Oct. 8, 2021, 27 pages, https://en.wikipedia.org/wiki/PID_controller.

* cited by examiner

PID CONTROLLER FOR EVENT INGESTION THROTTLING

TECHNICAL FIELD

This disclosure relates generally to computer operations and more particularly, but not exclusively to providing real-time management of information technology operations.

BACKGROUND

IT systems are increasingly becoming complex, multi-variate, and in some cases non-intuitive systems with varying degrees of nonlinearity. These complex IT systems may be difficult to model or accurately understand. Various monitoring systems may be arrayed to provide alerts, notifications, or the like, in an effort to provide visibility into operational metrics, failures, and/or correctness. However, the sheer size and complexity of these IT systems may result in a flooding of disparate event messages from disparate monitoring/reporting services.

With the increased complexity of distributed computing systems event reporting and/or management may overwhelm IT teams tasked to manage them. At enterprise scale, IT systems may have millions of components resulting in a complex inter-related set of monitoring systems that report millions of events from disparate subsystems. Manual techniques and pre-programmed rules are labor intensive and expensive, especially in the context of large centralized IT Operations with very complex systems distributed across large numbers of components. Further, these manual techniques may limit the ability to scale and evolve for future advances in IT systems capabilities.

SUMMARY

Disclosed herein are implementations of a proportional-integral-derivative controller for event ingestion throttling.

A first aspect is a method for event processing. The method includes accepting for processing, as accepted events and according to a target rate limit, at least a subset of received events; associating respective ingested timestamps with the accepted events; associating respective processing completion timestamps with processed events of the accepted events; determining an average measured lag time using at least a subset of the respective processing completion timestamps and corresponding respective ingested timestamps; obtaining a throttled rate limit using a proportional-integral-derivative (PID) controller; and accepting subsequent events according to the throttled rate limit. The PID controller can be configured to use, as an input, an error value that is a difference between a target lag time and the average measured lag time. An integral part of the PID controller can be set to zero responsive to an accumulated average lag time being less than the target lag time.

A second aspect is a method that includes processing accepted events, where each accepted event is associated with a respective ingested timestamp, a respective processing-start timestamp, and a respective processing-complete timestamp, and where events are accepted at a rate of a target rate limit; obtaining an error as a difference between a target lag time and a second value, the second value being an average of differences between the respective processing-complete timestamps and the respective ingested timestamps; obtaining a base throttle using previous error values and the error, where the base throttle is smaller than the target rate limit; and accepting subsequent events at a new rate obtained from the base throttle.

A third aspect is an apparatus that includes a memory and a processor. The processor is configured to accept events for the processing at a target rate limit and to complete the processing of an event in no more the a target lag time. The processor is further configured to execute instructions stored in the memory to process accepted events that include first events associated with a first routing key and second events associated with a second routing key; use a proportional-integral-derivative (PID) controller to obtain a throttled rate limit of the target rate limit, where the throttled rate limit is smaller than the target rate limit; scale the throttled rate limit to obtain a first scaled throttled rate limit; scale the throttled rate limit to obtain a second scaled throttled rate limit; accept first subsequent events associated with the first routing key according to the first scaled throttled rate limit; and accept second subsequent events associated with the second routing key according to the second scaled throttled rate limit.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
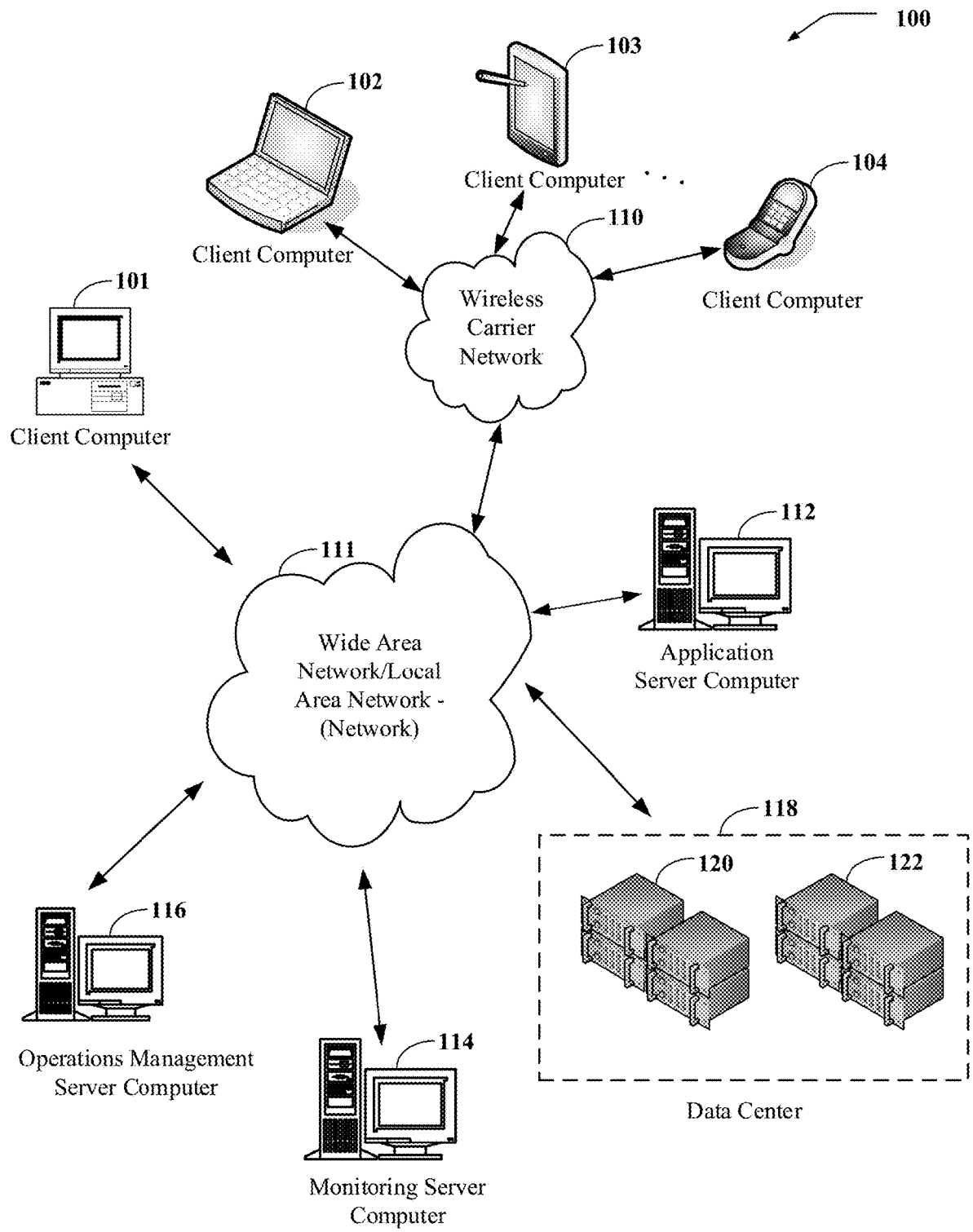
FIG. 1 shows components of one embodiment of a computing environment for event management.

An event management bus (EMB) is a computer system that may be arranged to monitor, manage, or compare the operations of one or more organizations. The EMB may be arranged to accept various events that indicate conditions occurring in the one or more organizations. The EMB may be arranged to manage several separate organizations at the same time. Briefly, an event can simply be a state of change to an information technology service of an organization. An event can be or describe a fact at a moment in time that may consist of a single or a group of correlated conditions that have been monitored and classified into an actionable state. Depending on the level of impact (e.g., degradation of a service), if any, to one or more constituents of a managed organization, an event may be, may be classified as, may be converted into, an incident.

One or more systems of one or more organizations may be configured to transmit events to the EMB for processing. The EMB may provide several services. A service may, for example, process an event into an actionable item (e.g., an incident). A received event from an organization may include an indication of one or more services that are to operate on (e.g., process, etc.) the event. The indication of the service is referred to herein as a routing key. A routing key may be unique to a managed organization. As such, two events that are received from two different managed organizations for processing by a same service would include two different routing keys. A routing key may be unique to the service that is to receive and process an event. As such, two events associated with two different routing keys and received from the same managed organization for processing may be directed to (e.g., processed by) different services.

At a high level, an event may be received at an ingestion engine of the EMB, accepted by the ingestion engine and queued for processing, and then processed. Processing an event can include triggering (e.g., initiating) an incident, sending a notification of the incident, and/or triggering a response (e.g., a resolution) to the incident. The ingestion engine can associate an ingested timestamp with an event to indicate the time that the event was accepted and placed in a queue for further processing. The ingestion engine can also associate a unique identifier with each accepted event. In an example, the ingested timestamp may be a timestamp assigned to the event by a transmitter of the event to the EMB. As such, the ingested timestamp may be the event creation timestamp by the transmitter where the event is accepted and placed in a queue for further processing. Receiving an event by the EMB encompasses receiving data from a transmitter that the EMB uses to create an event.

Processing an event may include advancing the event through several steps within a pipeline of the EMB. An event-completion tracker of the EMB may maintain (e.g., have access to, set, store, etc.) a state associated with the event as the event proceeds through the pipeline. As such, the state of an event can include a processing-start timestamp indicating the start of processing on the event and a processing-complete timestamp indicating the end of processing of the event. An event may be placed in a queue (e.g., a first-in-first-out queue) until resources are available for processing the event. The processing-start timestamp of the event may be set when the event is removed from the queue for processing. An event that is ongoing processing may be referred to as an in-flight event. An in-flight event has an associated processing-start timestamp but does not have a processing-complete timestamp. Depending on the application (e.g., needs, implementation, etc.), completion of processing of an event can have different semantics. That is, when processing of an event is considered completed can vary. As such, the event-completion tracker may be, or may be considered to be, disposed (e.g., placed, implemented, injected, etc.), at different locations within the pipeline, depending on the need. Processing of an event may be considered to be completed, for example, if (e.g., at a time that) the event is dropped, if (e.g., at a time that) an incident is created from the event, if (e.g., at a time that) the event resolves an incident, etc.

As can be appreciated, different events may require different processing times. The EMB may include guardrails (e.g., targets, thresholds, etc.) to ensure that the performance of the EMB does not degrade. For example, the EMB may include a target rate limit that indicates a maximum number of events that may be accepted for processing (such as per minute). In some examples, the target rate limit may be set by organization, by routing key, or according to some other granularity. To illustrate, the ingestion engine may not accept (i.e., may reject) a received event in a case that the target rate limit is met. In an example, the target rate limit may be set to 120 events per minute per routing key or some other target rate limit.

Accepting an event can mean that the event is queued for further processing and a notification may be transmitted to the sender indicating that the event is accepted. Rejecting the event can mean that the event is not queued for further processing and a notification may be transmitted to the sender indicating that the event is not accepted. The sender of the event may re-try (e.g., re-transmit) the event at a later time. The notification can be a response to a request that includes the event. To illustrate, and without limitations, a response that includes a first return code (e.g., 200) can indicate that the event was accepted and a response that includes a second return code (e.g., 500) can indicate that the event was rejected.

However, accepting events according to the rate limit may not be sufficient to ensure that the performance of the EMB does not degrade. For example, a performance criterion of the EMB may be that events are to be processed within a certain processing time (referred to herein as a set point or a target lag time). Constituents of managed organizations expect to get notifications of the results of processing at least some of the events within the target lag time. The time between accepting an event and completion of processing of the event is referred to as lag time or measured lag time. The target lag time can have different semantics. In an example, the target lag time can be the time between receiving an event from an organization, processing the event to determine whether an incident should be triggered, and triggering the incident (if one is to be triggered).

At the steady state of the EMB, events can typically and easily be processed within and in significantly less time than the target lag time. The target lag time can be set to accommodate bursts of events, which are queued before processing, or to accommodate slow events (e.g., events that require more than an average processing time). The target lag time can be set to take into account the queuing time in addition to the processing time of an event.

However, due to several causes, the EMB may not be able to, at least temporarily, meet the performance criterion. For example, some services of the EMB may include faulty or suboptimal logic resulting in degraded performance when processing at least certain types of or certain events. For example, certain events (referred to herein as slow events), which may be associated with certain routing keys, may require complex processing and, as such, the EMB may not be able to process as many events as it might otherwise. Said another way, certain events or certain routing keys may cause performance degradation.

In some implementations, and to enable parallel processing and/or scaling of the EMB so that the EMB can handle (e.g., process, etc.) more and more events or more and more organizations, the events may be grouped into partitions. In an example, a partition can be, or can be thought of, as a queue (e.g., a first-in-first-out queue) of events. In another example, a partition can be or can include multiple queues such that processing the queues of the partition share the same computing resources. The ingestion engine can add an accepted event to a partition.

In an example, the routing key associated with an event can be used to determine the partition (or a queue therein) that the event is to be added to. For example, a hash of the routing key of an event may be used to determine the partition that the event is to be added to. To illustrate, and without loss of generality, an integer value corresponding to the routing key may be obtained. The remainder (e.g., using a modulo operation) of dividing the integer value by the number of partitions can be used as the partition number to add the event to. Due to the hashing, events associated with multiple routing keys or multiple organizations may be added to the same partition. As such, slow events can delay processing of other events in the same partition.

In such situations, if events are actually received within the target rate limit but the EMB is unable to process events within the set point time (i.e., the target lag time), the events will be rejected (i.e., will not be accepted for further processing) to enable the EMB to recover to a point that the EMB is able to process events according to the target lag time. The EMB is said to throttle the target rate limit. Throttling, as used herein, refers to reducing, for a period of time (i.e., a throttling period), the number of events that will be accepted. When the actual processing time of accepted events exceeds the target lag time, the EMB may reduce (e.g., throttle) the rate of acceptance of events for processing. After the throttling period ends (e.g., expires, etc.), the rate limit may be reset to its original value. As used herein, a throttled rate limit is a reduced value of the target rate limit.

In an example, the sender of a rejected event may be configured to re-transmit an event that is rejected during the throttling period. For example, the sender may be configured to keep track of its event sending rate and if the sending rate is within the target rate limit, the sender may re-transmit the event. In an example, the sender may drop (i.e., not re-send) rejected events. In an example, the sender may re-transmit events the sender deems to be of sufficient priority to warrant re-transmission to the EMB. Other configurations of the sender with respect to rejected events are possible.

In a naive implementation of throttling, the event-completion tracker of the EMB can set a fixed throttling value and for a fixed throttling period. The event-completion tracker may, for example, determine to throttle the target rate limit in response to determining that one or more events (such as by examining the ingested timestamps of the one or more events) were queued for longer than a specific period before being processed. As such, a determination to throttle the target rate limit may depend on the queuing time. To illustrate, and without limitations, in response to determining that an event was queued for 91 seconds, the event-completion tracker may notify the ingestion engine to throttle the rate limit from the target rate limit (e.g., 120 events per minute) to a first throttled rate limit (e.g., 100 events per minute) for a throttling period (e.g., 10 minutes), and in response to determining that an event was queued for 180 seconds, the event-completion tracker may notify the ingestion engine to throttle the rate limit from the target rate limit (e.g., 120 events per minute) to a second throttled rate limit (e.g., 85 events per minute).

However, such a throttling implementation can result in the unnecessary throttling of the acceptance of events corresponding to many routing keys and/or many organizations when, in fact, the long queuing time may have been due the EMB experiencing a slight, and transient, degradation due to a single outlier event. In another situation, the long queuing time may be due to the slow events corresponding to one (or a few) routing keys. Yet, such naive throttling implementations would result in the unnecessary throttling for all routing keys including those corresponding to events that are not slow events. Additionally, setting a fixed (and long) throttling period may result in the unnecessary rejection of operations in event when, in fact, the EMB may recover and be able to accept events at the target rate limit (or some other rate limit that is between the throttled rate limit and the target rate limit) after processing just one or a few slow events.

Another problem with the naive implementation is that the event-completion tracker may itself be faulty and may not issue throttling directives to the ingestion engine in situations where it would have had it not been faulty. As such, the ingestion engine may accept events even though the EMB is not likely to process at least some of these events within the target lag time resulting in the EMB falling and further behind.

Implementations according to this disclosure may utilize a proportional-integral-derivative (PID) controller to dynamically throttle the target rate limit. The PID controller monitors the pipeline of the EMB (or a portion thereof), without being part of the pipeline, to determine whether to throttle the target rate limit (i.e., whether to use a throttled rate limit instead of the target rate limit). The PID controller monitors how events flow through the pipeline. More specifically, the PID controller determines a throttled rate limit by monitoring (e.g., comparing, etc.) the lag times (i.e., measured lag times) of events (e.g., most recently processed events for a given routing key) as compared to the target lag time. As such, the PID controller may be configured to use, as an input, an error that is a difference between the average lag time and the target lag time, such as of most recently processed events.

The PID controller described herein (or more specifically, the throttling performed by the PID controller) improves recovery of the EMB when a processing constraint is resolved by prioritizing more recent events and rejecting old events. The EMB can essentially implement a policy that more recently received events at the EMB are more valuable events to process than older events received at the EMB. Said another way, processing later received events can be a better event management policy than processing earlier received events. If the EMB were to simply continue to accept and queue received events for processing, the recovery time (i.e., the time it takes the EMB to return to a state of performance according to the target lag time) may be extended and, in some situation, the EMB may never be able to catch up and again reach the target lag time once it falls behind. The EMB rejects events received while the EMB cannot meet the target lag time in favor of later-received events.

The PID controller obtains a throttled target limit by adding a PID throttling value to the target rate limit. The PID throttling value can be obtained by adding (e.g., summing) a proportional throttling value, an integrated throttling value, and a derivative throttling value. The PID throttling value may be a negative value that is added to the target rate limit to obtain the throttled rate limit. In a case that the PID throttling value is a positive value, and as such, the throttled rate limit would be greater than the target rate limit, then no throttling may be performed and the EMB continues to accept events at the target rate limit.

The proportional part of the PID controller essentially provides a proportional throttling value that is based on how far off a current measured average lag time is from the target rate limit. The integrated throttling value is based on accumulated (i.e., over time) average lag times as compared to the target lag time and provides an indication of how quickly the measured lag time of the EMB is approaching the target lag time. The derivative throttling value provides an indication of how far off the measured lag time of the EMB is still from the target lag time. The derivative throttling value considers the rate of change of the error.

The PID controller described herein differs from a prototypical PID controller in several aspects.

For example, the prototypical PID controller constantly outputs a control signal. The prototypical PID controller may control the control signal up and down toward an ideal set point. Contrastingly, the PID controller is configured such that if the error is positive, the PID controller does not perform any throttling. That is, no throttling is necessary if the measured lag time is less than the target lag time because the EMB is performing within the performance criterion. The PID controller does not throttle above the target rate limit. In that sense, the PID controller can be considered to be one-directional as it only minimizes the measured lag: No throttling is performed then the measured lag is below the set point.

In the prototypical PID controller, the integral control accumulates error for as long as the prototypical PID controller is running. While the measured value is below the set point, the prototypical PID controller accumulates positive error. Once the measured value reaches the set point, the accumulated error would influence towards an overshoot of the set point, which would be expected to be dampened by the derivative control. If the measured value lightly oscillates around the set point, the accumulated error of the integral control would cancel out to zero.

If the integral control of the PID controller described herein were to be used in this prototypical fashion for throttling, then during normal operation, where the measured lag is well below the target lag time, the integral control would steadily accumulate positive error. When the target lag time is eventually crossed, and due to the enormous accumulated error, the integral control may counteract attempts by the proportional control at bringing the measured lag down to the target lag time, which may result in a potentially long delay before the PID controller can mitigate the lag. Thus, the PID controller according to this disclosure can be further configured to accumulate only negative error (the error that is observed when the measured lag exceeds the target lag time). The integral part of the PID controller accumulates error in a time window (referred to herein as a lookback window).

In the prototypical PID controller, the derivative control is calculated based on the difference between a current error value and an immediately preceding error value. However, as already mentioned, events may at times be received in bursts, which may result in derivative kick. Derivative kick occurs when there is a momentary spike, which the derivative controller may consider to be (e.g., may misinterpret as, etc.) a sharp trajectory upwards that the derivative control may overreact and generate a throttle.

Contrastingly, and to better handle the spikiness of input (i.e., spikiness in measured lag values), the derivative control of the PID controller described herein can be configured to compare a moving average of error values rather than two error value points in time. In an example, the moving average can be computed over the same window as the lookback window of the integral control. However, the lookback window and the window for obtaining the moving average can be different.

In some implementations, throttling can be performed per routing key. That is, the throttling can be apportioned to the routing keys according to the levels of delay (e.g., errors) caused by events associated with the routing keys. The throttled rate limit can be scaled to obtain respective scaled throttled rate limits for the routing keys. A routing key can be further throttled (using a scaled throttled rate limit that is obtained from the throttled rate limit) using, inter alia, the amount of processing time the events associated with the routing key use as compared to the amount of processing time of all events of the partition or as compared to the amount of processing time of respective events of other routing keys of the partition. As further described herein, the average event processing time for a routing key and the average event processing time for a partition can be used to obtain a scaled throttled rate limit the routing key. Scaling of the throttled rate limit can be obtained by the PID controller itself, as a post processing step performed on the output of the PID controller, or by some other component or function.

To illustrate, and without limitations, assume that the target rate limit is 120 events per minute, that the target lag time (i.e., the set point) is 2 minutes, and that the average measured lag is 2.5 minutes. As such, the current error is −0.5 (i.e., target rate limit−average measured lag). As such, the EMB is not meeting the performance criterion and throttling is required. Assume further that first events of a first routing key, which are received at exactly the rate limit (i.e., 120 events per minute), each requires a minimal processing time. As such, the error cannot not be said to be attributable to the first routing key. On the other hand, second events of a second routing key are slow events and each requires at least 10 seconds to process. As such, the error is attributable to the second routing key. While, overall, throttling is required to bring the EMB performance to within the performance criterion, the throttling response of the PID controller can be tailored to (i.e., can be proportioned by, etc.) routing keys according to their contributions to the error.

The term "organization" or "managed organization" as used herein refers to a business, a company, an association, an enterprise, a confederation, or the like.

The term "event," as used herein, can refer to one or more outcomes, conditions, or occurrences that may be detected or observed by an event management bus. An event management bus (which can also be referred to as an event ingestion and processing system) may be configured to monitor various types of events depending on needs of an industry and/or technology area. For example, information technology services may generate events in response to one or more conditions, such as, computers going offline, memory overutilization, CPU overutilization, storage quotas being met or exceeded, applications failing or otherwise becoming unavailable, networking problems (e.g., latency, excess traffic, unexpected lack of traffic, intrusion attempts, or the like), electrical problems (e.g., power outages, voltage fluctuations, or the like), customer service requests, or the like, or combination thereof.

Events may be provided to the event management bus using one or more messages, emails, telephone calls, library function calls, application programming interface (API) calls, including, any signals provided to an event management bus indicating that an event has occurred. One or more third party and/or external systems may be configured to generate event messages that are provided to the event management bus.

The term "resource" as used herein can refer to a person or entity that may be responsible for responding to an event associated with a monitored application or service. For example, resources may be members of an information technology (IT) team providing support to employees of a company. Resources may be notified if an event they are responsible for handling at that time is encountered. In some embodiments, a scheduler application may be arranged to associate one or more resources with times that they are responsible for handling particular events (e.g., times when they are on-call to maintain various IT services for a company). A resource that is determined to be responsible for handling a particular event may be referred to as a responsible resource. Responsible resources may be considered to be on-call and/or active during the period of time they are designated by the schedule to be available.

The term "incident" as used herein can refer to a condition or state in the managed networking environments that requires some form of resolution by a user or automated service. Typically, incidents may be a failure or error that occurs in the operation of a managed network and/or computing environment. One or more events may be associated with one or more incidents. However, not all events are associated with incidents.

The term "incident response" as used herein can refer to the actions, resources, services, messages, notifications, alerts, events, or the like, related to resolving one or more incidents. Accordingly, services that may be impacted by a pending incident, may be added to the incident response associated with the incident. Likewise, resources responsible for supporting or maintaining the services may also be added to the incident response. Further, log entries, journal entries, notes, timelines, task lists, status information, or the like, may be part of an incident response.

The term "notification message" or "notification event" as used herein can refer to a communication provided by an incident management system to a message provider for delivery to one or more responsible resources or responders. A notification event may be used to inform one or more responsible resources that one or more event messages were received. For example, in at least one of the various embodiments, notification messages may be provided to the one or more responsible resources using SMS texts, MMS texts, email, Instant Messages, mobile device push notifications, HTTP requests, voice calls (telephone calls, Voice Over IP calls (VOIP), or the like), library function calls, API calls, URLs, audio alerts, haptic alerts, other signals, or the like, or combination thereof.

The term "responder" as used herein refers to a resource that is a resource that is responsible for responding to one or more notification events.

The term "team" as used herein refers to one or more resources that may be jointly responsible for maintaining or supporting one or more services or system for an organization.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

FIG. 1 shows components of one embodiment of a computing environment 100 for event management. Not all the components may be required to practice various embodiments, and variations in the arrangement and type of the components may be made. As shown, the computing environment 100 includes local area networks (LANs)/wide area networks (WANs) (i.e., a network 111), a wireless network 110, client computers 101-104, an application server computer 112, a monitoring server computer 114, and an operations management server computer 116, which may be or may implement an EMB.

Generally, the client computers 102-104 may include virtually any portable computing device capable of receiving and sending a message over a network, such as the network 111, the wireless network 110, or the like. The client computers 102-104 may also be described generally as client computers that are configured to be portable. Thus, the client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. Likewise, the client computers 102-104 may include Internet-of-Things (IOT) devices as well. Accordingly, the client computers 102-104 typically range widely in terms of capabilities and features. For example, a cell phone may have a numeric keypad and a few lines of monochrome Liquid Crystal Display (LCD) on which only text may be displayed. In another example, a mobile device may have a touch sensitive screen, a stylus, and several lines of color LCD in which both text and graphics may be displayed.

The client computer 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of the client computers 102-104 may operate over wired and/or wireless network. Today, many of these devices include a capability to access and/or otherwise communicate over a network such as the network 111 and/or the wireless network 110. Moreover, the client computers 102-104 may access various computing applications, including a browser, or other web-based application.

In one embodiment, one or more of the client computers 101-104 may be configured to operate within a business or other entity to perform a variety of services for the business or other entity. For example, a client of the client computers 101-104 may be configured to operate as a web server, an accounting server, a production server, an inventory server, or the like. However, the client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one embodiment, a user of the client computer may employ the browser application to perform various actions over a network.

The client computers 101-104 also may include at least one other client application that is configured to receive and/or send data, operations information, between another computing device. The client application may include a capability to provide requests and/or receive data relating to managing, operating, or configuring the operations management server computer 116.

The wireless network 110 can be configured to couple the client computers 102-104 with network 111. The wireless network 110 may include any of a variety of wireless sub-networks that may further overlay stand-alone ad-hoc networks, or the like, to provide an infrastructure-oriented connection for the client computers 102-104. Such sub-networks may include mesh networks, Wireless LAN (WLAN) networks, cellular networks, or the like.

The wireless network 110 may further include an autonomous system of terminals, gateways, routers, or the like connected by wireless radio links, or the like. These connectors may be configured to move freely and randomly and organize themselves arbitrarily, such that the topology of the wireless network 110 may change rapidly.

The wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as the client computers 102-104 with various degrees of mobility. For example, the wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, the wireless network 110 may include virtually any wireless communication mechanism by which information may travel between the client computers 102-104 and another computing device, network, or the like.

The network 111 can be configured to couple network devices with other computing devices, including, the operations management server computer 116, the monitoring server computer 114, the application server computer 112, the client computer 101, and through the wireless network 110 to the client computers 102-104. The network 111 can be enabled to employ any form of computer readable media for communicating information from one electronic device to another. Also, the network 111 can include the internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within the network 111 and the wireless network 110. Furthermore, remote computers and other related electronic devices could be remotely connected to either LANs or WANs via a modem and temporary telephone link. In essence, the network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Figure 3:
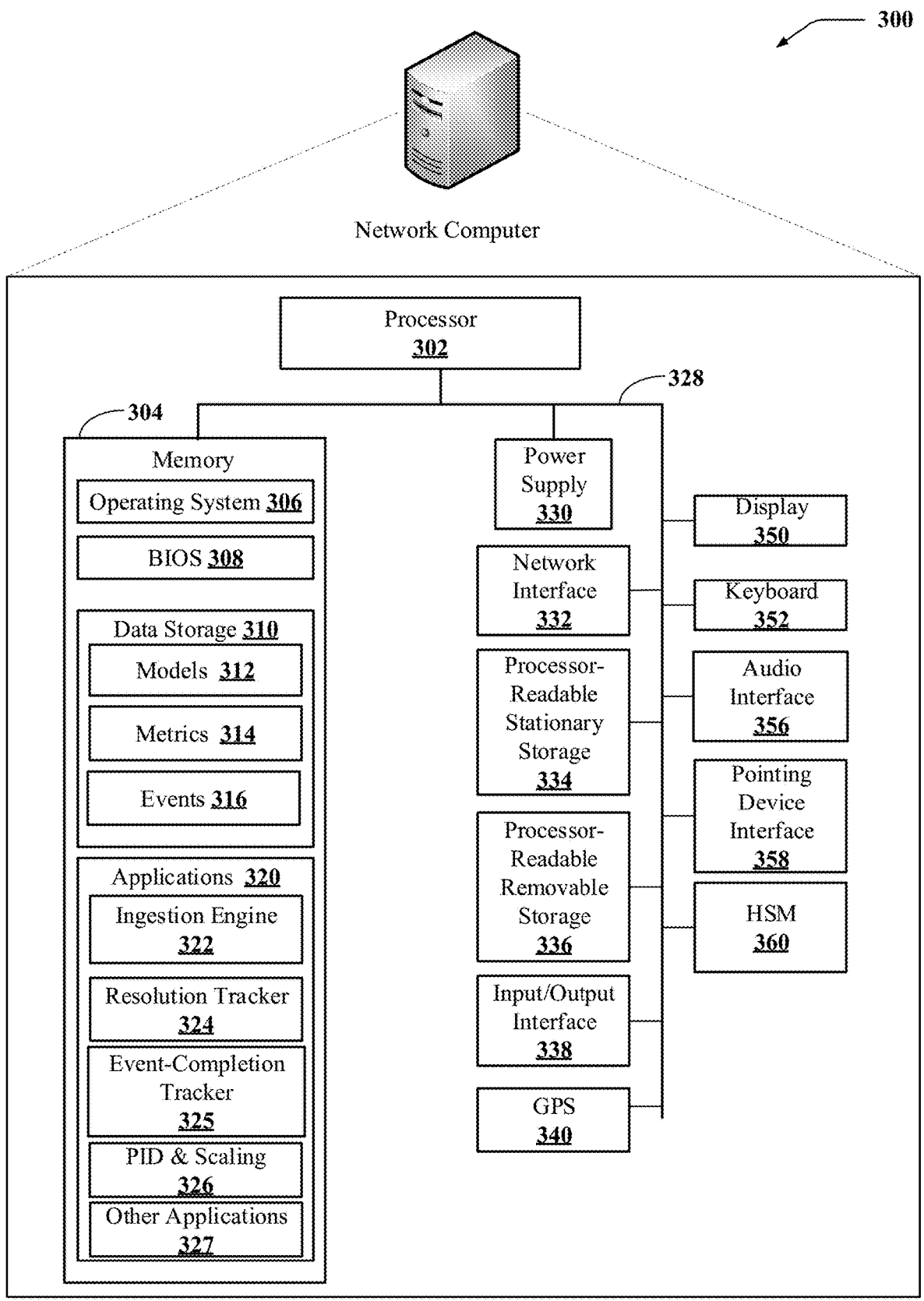
FIG. 3 shows one embodiment of a network computer that may at least partially implement one of the various embodiments.

The operations management server computer 116 may include virtually any network computer usable to provide computer operations management services, such as a network computer, as described with respect to FIG. 3. In one embodiment, the operations management server computer 116 employs various techniques for managing the operations of computer operations, networking performance, customer service, customer support, resource schedules and notification policies, event management, or the like. Also, the operations management server computer 116 may be arranged to interface/integrate with one or more external systems such as telephony carriers, email systems, web services, or the like, to perform computer operations management. Further, the operations management server computer 116 may obtain various events and/or performance metrics collected by other systems, such as, the monitoring server computer 114.

In at least one of the various embodiments, the monitoring server computer 114 represents various computers that may be arranged to monitor the performance of computer operations for an entity (e.g., company or enterprise). For example, the monitoring server computer 114 may be arranged to monitor whether applications/systems are operational, network performance, trouble tickets and/or their resolution, or the like. In some embodiments, one or more of the functions of the monitoring server computer 114 may be performed by the operations management server computer 116.

Devices that may operate as the operations management server computer 116 include various network computers, including, but not limited to personal computers, desktop computers, multiprocessor systems, microprocessor-based or programmable consumer electronics, network PCs, server devices, network appliances, or the like. It should be noted that while the operations management server computer 116 is illustrated as a single network computer, the invention is not so limited. Thus, the operations management server computer 116 may represent a plurality of network computers. For example, in one embodiment, the operations management server computer 116 may be distributed over a plurality of network computers and/or implemented using cloud architecture.

Moreover, the operations management server computer 116 is not limited to a particular configuration. Thus, the operations management server computer 116 may operate using a master/slave approach over a plurality of network computers, within a cluster, a peer-to-peer architecture, and/or any of a variety of other architectures.

In some embodiments, one or more data centers, such as a data center 118, may be communicatively coupled to the wireless network 110 and/or the network 111. In at least one of the various embodiments, the data center 118 may be a portion of a private data center, public data center, public cloud environment, or private cloud environment. In some embodiments, the data center 118 may be a server room/data center that is physically under the control of an organization. The data center 118 may include one or more enclosures of network computers, such as, an enclosure 120 and an enclosure 122.

The enclosure 120 and the enclosure 122 may be enclosures (e.g., racks, cabinets, or the like) of network computers and/or blade servers in the data center 118. In some embodiments, the enclosure 120 and the enclosure 122 may be arranged to include one or more network computers arranged to operate as operations management server computers, monitoring server computers (e.g., the operations management server computer 116, the monitoring server computer 114, or the like), storage computers, or the like, or combination thereof. Further, one or more cloud instances may be operative on one or more network computers included in the enclosure 120 and the enclosure 122.

The data center 118 may also include one or more public or private cloud networks. Accordingly, the data center 118 may comprise multiple physical network computers, interconnected by one or more networks, such as, networks similar to and/or the including network 111 and/or wireless network 110. The data center 118 may enable and/or provide one or more cloud instances (not shown). The number and composition of cloud instances may be vary depending on the demands of individual users, cloud network arrangement, operational loads, performance considerations, application needs, operational policy, or the like. In at least one of the various embodiments, the data center 118 may be arranged as a hybrid network that includes a combination of hardware resources, private cloud resources, public cloud resources, or the like.

As such, the operations management server computer 116 is not to be construed as being limited to a single environment, and other configurations, and architectures are also contemplated. The operations management server computer 116 may employ processes such as described below in conjunction with at least some of the figures discussed below to perform at least some of its actions.

Figure 2:
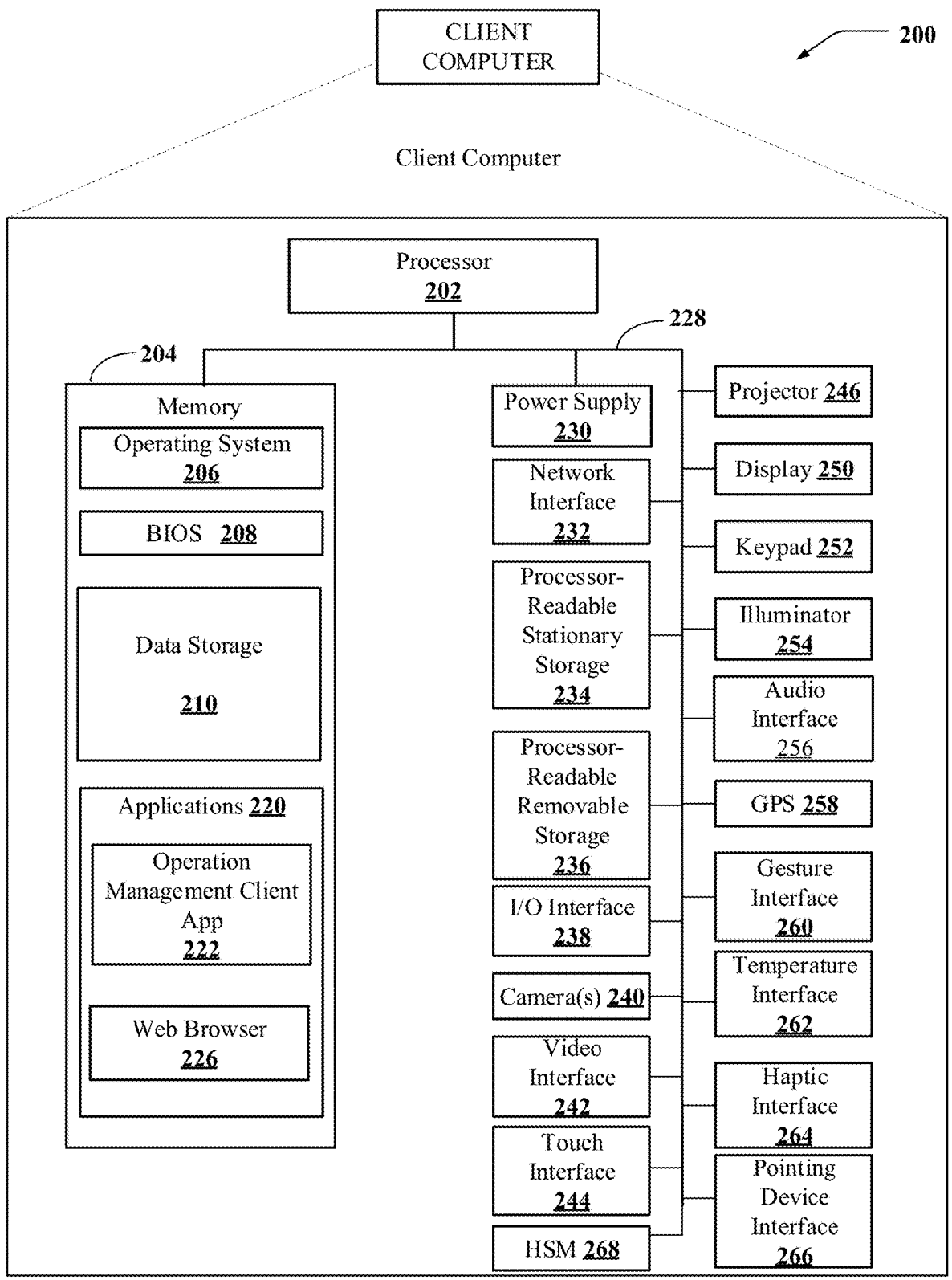
FIG. 2 shows one embodiment of a client computer.

FIG. 2 shows one embodiment of a client computer 200. The client computer 200 may include more or less components than those shown in FIG. 2. The client computer 200 may represent, for example, at least one embodiment of mobile computers or client computers shown in FIG. 1.

The client computer 200 may include a processor 202 in communication with a memory 204 via a bus 228. The client computer 200 may also include a power supply 230, a network interface 232, an audio interface 256, a display 250, a keypad 252, an illuminator 254, a video interface 242, an input/output interface (i.e., an I/O interface 238), a haptic interface 264, a global positioning systems (GPS) receiver 258, an open air gesture interface 260, a temperature interface 262, a camera 240, a projector 246, a pointing device interface 266, a processor-readable stationary storage device 234, and a non-transitory processor-readable removable storage device 236. The client computer 200 may optionally communicate with a base station (not shown), or directly with another computer. And in one embodiment, although not shown, a gyroscope may be employed within the client computer 200 to measuring or maintaining an orientation of the client computer 200.

The power supply 230 may provide power to the client computer 200. A rechargeable or non-rechargeable battery may be used to provide power. The power may also be provided by an external power source, such as an AC adapter or a powered docking cradle that supplements or recharges the battery.

The network interface 232 includes circuitry for coupling the client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. The network interface 232 is sometimes known as a transceiver, transceiving device, or network interface card (NIC).

The audio interface 256 may be arranged to produce and receive audio signals such as the sound of a human voice. For example, the audio interface 256 may be coupled to a speaker and microphone (not shown) to enable telecommunication with others or generate an audio acknowledgement for some action. A microphone in the audio interface 256 can also be used for input to or control of the client computer 200, e.g., using voice recognition, detecting touch based on sound, and the like.

The display 250 may be a liquid crystal display (LCD), gas plasma, electronic ink, light emitting diode (LED), Organic LED (OLED) or any other type of light reflective or light transmissive display that can be used with a computer. The display 250 may also include a touch interface 244 arranged to receive input from an object such as a stylus or a digit from a human hand, and may use resistive, capacitive, surface acoustic wave (SAW), infrared, radar, or other technologies to sense touch or gestures.

The projector 246 may be a remote handheld projector or an integrated projector that is capable of projecting an image on a remote wall or any other reflective object such as a remote screen.

The video interface 242 may be arranged to capture video images, such as a still photo, a video segment, an infrared video, or the like. For example, the video interface 242 may be coupled to a digital video camera, a web-camera, or the like. The video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

The keypad 252 may comprise any input device arranged to receive input from a user. For example, the keypad 252 may include a push button numeric dial, or a keyboard. The keypad 252 may also include command buttons that are associated with selecting and sending images.

The illuminator 254 may provide a status indication or provide light. The illuminator 254 may remain active for specific periods of time or in response to event messages. For example, when the illuminator 254 is active, it may backlight the buttons on the keypad 252 and stay on while the client computer is powered. Also, the illuminator 254 may backlight these buttons in various patterns when particular actions are performed, such as dialing another client computer. The illuminator 254 may also cause light sources positioned within a transparent or translucent case of the client computer to illuminate in response to actions.

Further, the client computer 200 may also comprise a hardware security module (i.e., an HSM 268) for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, the HSM 268 may be a stand-alone computer, in other cases, the HSM 268 may be arranged as a hardware card that may be added to a client computer.

The I/O 238 can be used for communicating with external peripheral devices or other computers such as other client computers and network computers. The peripheral devices may include an audio headset, display screen glasses, remote speaker system, remote speaker and microphone system, and the like. The I/O interface 238 can utilize one or more technologies, such as Universal Serial Bus (USB), Infrared, WiFi, WiMax, Bluetooth™, and the like.

The I/O interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to the client computer 200.

The haptic interface 264 may be arranged to provide tactile feedback to a user of the client computer. For example, the haptic interface 264 may be employed to vibrate the client computer 200 in a particular way when another user of a computer is calling. The temperature interface 262 may be used to provide a temperature measurement input or a temperature changing output to a user of the client computer 200. The open air gesture interface 260 may sense physical gestures of a user of the client computer 200, for example, by using single or stereo video cameras, radar, a gyroscopic sensor inside a computer held or worn by the user, or the like. The camera 240 may be used to track physical eye movements of a user of the client computer 200.

The GPS transceiver 258 can determine the physical coordinates of the client computer 200 on the surface of the earth, which typically outputs a location as latitude and longitude values. The GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of the client computer 200 on the surface of the earth. It is understood that under different conditions, the GPS transceiver 258 can determine a physical location for the client computer 200. In at least one embodiment, however, the client computer 200 may, through other components, provide other information that may be employed to determine a physical location of the client computer, including for example, a Media Access Control (MAC) address, IP address, and the like.

Human interface components can be peripheral devices that are physically separate from the client computer 200, allowing for remote input or output to the client computer 200. For example, information routed as described here through human interface components such as the display 250 or the keypad 252 can instead be routed through the network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Bluetooth LE, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include a web browser application 226 that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

The memory 204 may include RAM, ROM, or other types of memory. The memory 204 illustrates an example of computer-readable storage media (devices) for storage of information such as computer-readable instructions, data structures, program modules or other data. The memory 204 may store a BIOS 208 for controlling low-level operation of the client computer 200. The memory may also store an operating system 206 for controlling the operation of the client computer 200. It will be appreciated that this component may include a general-purpose operating system such as a version of UNIX, or LINUX™, or a specialized client computer communication operating system such as Windows Phone™, or IOS® operating system. The operating system may include, or interface with, a Java virtual machine module that enables control of hardware components or operating system operations via Java application programs.

The memory 204 may further include one or more data storage 210, which can be utilized by the client computer 200 to store, among other things, the applications 220 or other data. For example, the data storage 210 may also be employed to store information that describes various capabilities of the client computer 200. The information may then be provided to another device or computer based on any of a variety of methods, including being sent as part of a header during a communication, sent upon request, or the like. The data storage 210 may also be employed to store social networking information including address books, buddy lists, aliases, user profile information, or the like. The data storage 210 may further include program code, data, algorithms, and the like, for use by a processor, such as the processor 202 to execute and perform actions. In one embodiment, at least some of the data storage 210 might also be stored on another component of the client computer 200, including, but not limited to, the non-transitory processor-readable removable storage device 236, the processor-readable stationary storage device 234, or external to the client computer.

The applications 220 may include computer executable instructions which, when executed by the client computer 200, transmit, receive, or otherwise process instructions and data. The applications 220 may include, for example, an operations management client application 222. In at least one of the various embodiments, the operations management client application 222 may be used to exchange communications to and from the operations management server computer 116 of FIG. 1, the monitoring server computer 114 of FIG. 1, the application server computer 112 of FIG. 1, or the like. Exchanged communications may include, but are not limited to, queries, searches, messages, notification messages, events, alerts, performance metrics, log data, API calls, or the like, combination thereof.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), the client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the client computer 200 may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

FIG. 3 shows one embodiment of network computer 300 that may at least partially implement one of the various embodiments. The network computer 300 may include more or less components than those shown in FIG. 3. The network computer 300 may represent, for example, one embodiment of at least one EMB, such as the operations management server computer 116 of FIG. 1, the monitoring server computer 114 of FIG. 1, or an application server computer 112 of FIG. 1. Further, in some embodiments, the network computer 300 may represent one or more network computers included in a data center, such as, the data center 118, the enclosure 120, the enclosure 122, or the like.

As shown in the FIG. 3, the network computer 300 includes a processor 302 in communication with a memory 304 via a bus 328. The network computer 300 also includes a power supply 330, a network interface 332, an audio interface 356, a display 350, a keyboard 352, an input/output interface (i.e., an I/O interface 338), a processor-readable stationary storage device 334, and a processor-readable removable storage device 336. The power supply 330 provides power to the network computer 300.

The network interface 332 includes circuitry for coupling the network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. The network interface 332 is sometimes known as a transceiver, transceiving device, or network interface card (NIC). The network computer 300 may optionally communicate with a base station (not shown), or directly with another computer.

The audio interface 356 is arranged to produce and receive audio signals such as the sound of a human voice. For example, the audio interface 356 may be coupled to a speaker and microphone (not shown) to enable telecommunication with others or generate an audio acknowledgement for some action. A microphone in the audio interface 356 can also be used for input to or control of the network computer 300, for example, using voice recognition.

The display 350 may be a liquid crystal display (LCD), gas plasma, electronic ink, light emitting diode (LED), Organic LED (OLED) or any other type of light reflective or light transmissive display that can be used with a computer. The display 350 may be a handheld projector or pico projector capable of projecting an image on a wall or other object.

The network computer 300 may also comprise the I/O interface 338 for communicating with external devices or computers not shown in FIG. 3. The I/O interface 338 can utilize one or more wired or wireless communication technologies, such as USB™ Firewire™, WiFi, WiMax, Thunderbolt™, Infrared, Bluetooth™, Zigbee™, serial port, parallel port, and the like.

Also, the I/O interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to the network computer 300. Human interface components can be physically separate from network computer 300, allowing for remote input or output to the network computer 300. For example, information routed as described here through human interface components such as the display 350 or the keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through a pointing device interface 358 to receive user input.

A GPS transceiver 340 can determine the physical coordinates of network computer 300 on the surface of the Earth, which typically outputs a location as latitude and longitude values. The GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of the network computer 300 on the surface of the Earth. It is understood that under different conditions, the GPS transceiver 340 can determine a physical location for the network computer 300. In at least one embodiment, however, the network computer 300 may, through other components, provide other information that may be employed to determine a physical location of the client computer, including for example, a Media Access Control (MAC) address, IP address, and the like.

The memory 304 may include Random Access Memory (RAM), Read-Only Memory (ROM), or other types of memory. The memory 304 illustrates an example of computer-readable storage media (devices) for storage of information such as computer-readable instructions, data structures, program modules or other data. The memory 304 stores a basic input/output system (i.e., a BIOS 308) for controlling low-level operation of the network computer 300. The memory also stores an operating system 306 for controlling the operation of the network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

The memory 304 may further include a data storage 310, which can be utilized by the network computer 300 to store, among other things, applications 320 or other data. For example, the data storage 310 may also be employed to store information that describes various capabilities of the network computer 300. The information may then be provided to another device or computer based on any of a variety of methods, including being sent as part of a header during a communication, sent upon request, or the like. The data storage 310 may also be employed to store social networking information including address books, buddy lists, aliases, user profile information, or the like. The data storage 310 may further include program code, instructions, data, algorithms, and the like, for use by a processor, such as the processor 302 to execute and perform actions such as those actions described below. In one embodiment, at least some of the data storage 310 might also be stored on another component of the network computer 300, including, but not limited to, the non-transitory media inside processor-readable removable storage device 336, the processor-readable stationary storage device 334, or any other computer-readable storage device within the network computer 300 or external to network computer 300. The data storage 310 may include, for example, models 312, operations metrics 314, events 316, or the like.

The applications 320 may include computer executable instructions which, when executed by the network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. The applications 320 may include an ingestion engine 322, a resolution tracker engine 324, an event-completion tracker engine 325, a PID controller and scaling engine 326, other applications 327. In at least one of the various embodiments, one or more of the applications may be implemented as modules or components of another application. Further, in at least one of the various embodiments, applications may be implemented as operating system extensions, modules, plugins, or the like.

Furthermore, in at least one of the various embodiments, the ingestion engine 322, the resolution tracker engine 324, the event-completion tracker engine 325, the PID controller and scaling engine 326, the other applications 327, or the like, may be operative in a cloud-based computing environment. In at least one of the various embodiments, these applications, and others, that comprise the management platform may be executing within virtual machines or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines or virtual servers dedicated to the ingestion engine 322, the resolution tracker engine 324, the event-completion tracker engine 325, the PID controller and scaling engine 326, the other applications 327, may be provisioned and de-commissioned automatically.

In at least one of the various embodiments, the applications may be arranged to employ geo-location information to select one or more localization features, such as, time zones, languages, currencies, calendar formatting, or the like. Localization features may be used in user-interfaces and well as internal processes or databases. Further, in some embodiments, localization features may include information regarding culturally significant events or customs (e.g., local holidays, political events, or the like) In at least one of the various embodiments, geo-location information used for selecting localization information may be provided by the GPS transceiver 340. Also, in some embodiments, geolocation information may include information providing using one or more geolocation protocol over the networks, such as, the wireless network 108 or the network 111.

Also, in at least one of the various embodiments, the ingestion engine 322, the resolution tracker engine 324, the event-completion tracker engine 325, the PID controller and scaling engine 326, the other applications 327, or the like, may be located in virtual servers running in a cloud-based computing environment rather than being tied to one or more specific physical network computers.

Further, the network computer 300 may also comprise hardware security module (i.e., an HSM 360) for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, the HSM 360 may be a stand-alone network computer, in other cases, the HSM 360 may be arranged as a hardware card that may be installed in a network computer.

Additionally, in one or more embodiments (not shown in the figures), the network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Figure 4:
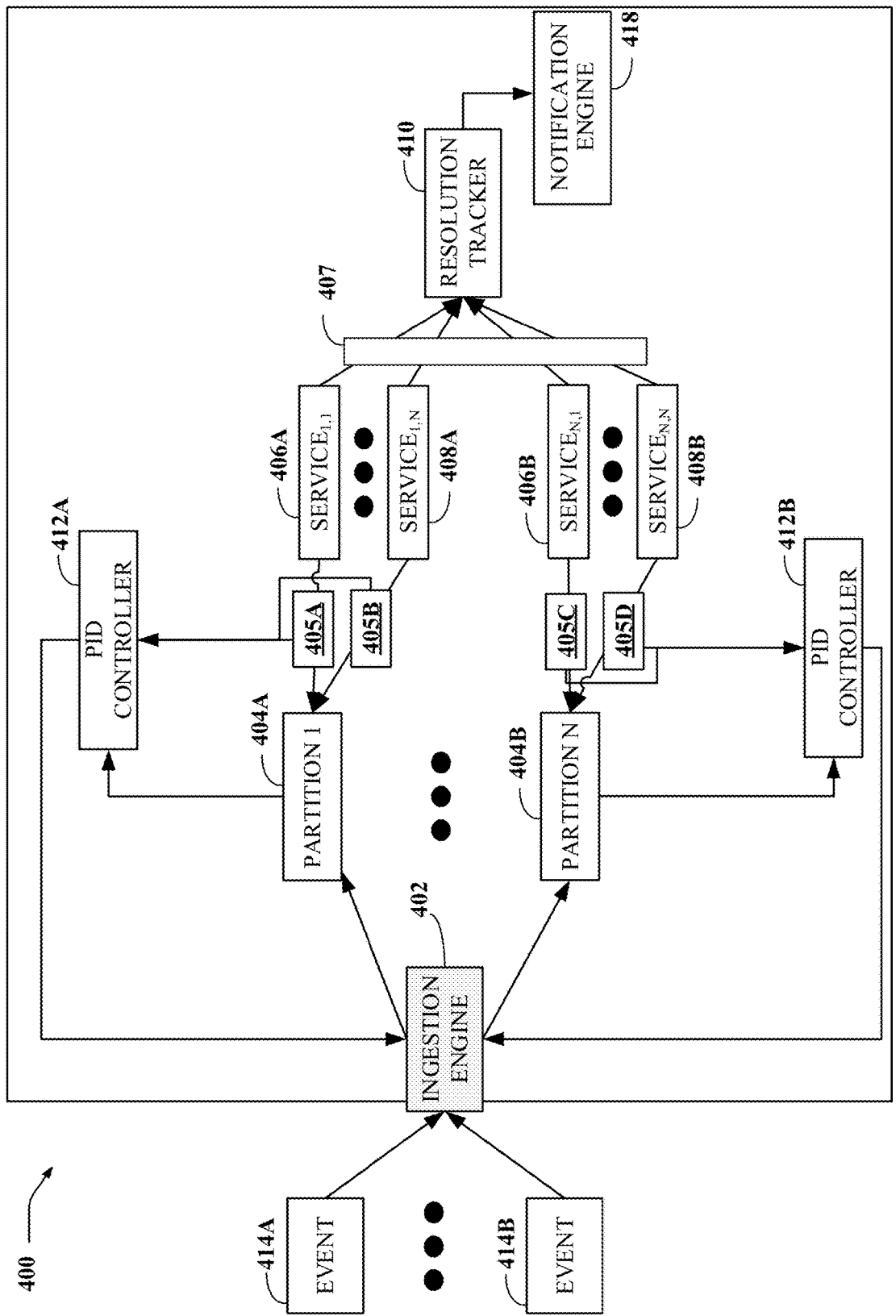
FIG. 4 illustrates a logical architecture of a system for event ingestion and processing.

FIG. 4 illustrates a logical architecture of system 400 for event ingestion and processing. In at least one of the various embodiments, a system for event ingestion and processing may comprise various components. In this example, the system 400 includes an ingestion engine 402, one or more partitions 404A-404B, one or more event-completion trackers 405A-405D, one or more services 406A-406B and 408A-408B, a resolution tracker 410, PID controllers 412A-412B, and a notification engine 418.

The system 400 may be configured to perform within a target lag time. More specifically, each partition of the system 400 may be configured to perform within the target lag time. In an example, the target lag time can be defined as the time within which a sender (or the sending organization of an event or a constituent therein) expects to receive a notification about an event (if the event is such that processing the event results in a notification) after the event is accepted by the system 400. Other semantics are possible for the target lag time. The system 400 may be configured to accept events for further processing at the target rate limit. The system 400 can be expected to perform within the target lag time when events are accepted at the target rate limit.

The ingestion engine 402 may be configured to receive or obtain one or more different types of events provided by various sources, here represented by events 414A, 414B. The ingestion engine 402 may accept or reject received events. If the ingestion engine 402 accepts an event, the ingestion engine 402 may place the event in a partition for further processing. If an event is rejected, the event is not placed in a partition for further processing. The ingestion engine may notify the sender of the event of whether the event was accepted or rejected. Events are accepted or rejected according to one or more currently active rate limits (e.g., the target rate limit, a throttled rate limit, or a scaled throttled rate limit), as described herein. Grouping events into partitions can be used to enable parallel processing and/or scaling of the system 400 so that the system 400 can handle (e.g., process, etc.) more and more events and/or more and more organizations.

In at least one of the various embodiments, an event may be stored in a partition, such as one of the partition 404A or the partition 404B. As mentioned above, a partition can be, or can be thought of, as a queue (i.e., a first-in-first-out queue) of events. FIG. 4 is shown as including two partitions (i.e., the partitions 404A and 404B). However, the disclosure is not so limited and the system 400 can include one or more than two partitions. While not specifically shown in FIG. 4, an event of a partition may undergo further processing before the event is handed off to a service (e.g., one of the services 406 or 408) for processing by the service An event-completion tracker (i.e., each of the one or more event-completion trackers 405A-405D) may obtain (e.g., collect, track, associate, set, assign, read, etc.) data associated with events where such data are used by a PID controller to determine throttling values. For example, and as further described herein, an event-completion tracker can associate with an event a processing-start timestamp and a processing-complete timestamp. As already mentioned, different semantics may be associated with the processing-complete timestamp. An event-completion tracker 405 can receive data from the different services that process events. Receiving data from a service by the event-completion tracker 405 encompasses receiving data directly from the service and/or accessing (e.g., polling for, querying for, asynchronously being notified of, etc.) data generated (e.g., set, assigned, calculated by, stored, etc.) by the service.

In the system 400, as shown in FIG. 4, a respective event-completion tracker (e.g., the event-completion tracker 405A) is shown as being associated with a respective service (e.g., the service 406A). However, the disclosure is not so limited and an event-completion tracker can be associated with one or more services associated with a partition, with one or more partitions, or some other configuration of (e.g., relationship between) event-completion trackers, services, and/or partitions. In an example, there can be a 1-1 correspondence between event-completion trackers and PID controllers in the system 400.

In an example, different services of the system 400 may be configured to operate on events of the different partitions. In an example, the same services (e.g., identical logic) may be configured to operate on the accepted events in different partitions. To illustrate, in FIG. 4, the services 406A and 408A process the events of the partition 404A, and the services 406B and 408B process the events of partition the 404B, where the service 406A and the service 406B execute the same logic (e.g., perform the same operations) of a first service but on different physical or virtual servers; and the service 408A and the service 408B execute the same logic of a second service but on different physical or virtual servers. In an example, different types of events may be routed to different partitions. As such, each of the services 406A-406-B and 408A-408B may perform different logic as appropriate for the events processed by the service.

In FIG. 4, the event-completion trackers 405A-405D are shown as being placed between the partitions and the services to illustrate that the processing of an event is considered complete when the event is handed off to a service. However, as already mentioned, depending on the semantics of event completion, the event-completion trackers may be considered to be logically placed elsewhere in the system 400. For example, if event completion means that processing by one or more of the services 406A-406B or 408A-408B is completed, then one or more event-completion trackers may be considered to be placed at a location 407 of the pipeline of the system 400 so that the one or more event-completion trackers can accordingly obtain processing-complete timestamps.

An (e.g., each) event, may also be associated with one or more services that may be responsible for processing (e.g., such as resolving, etc.) the events. As such, an event can be said to be addressed or targeted to the one or more services that are to process the event. As mentioned above, an event can include or can be associated with a routing key that indicates the one or more services that are to receive the event for processing.

The ingestion engine 402 may be configured to accept events according to a currently active rate limit (i.e. a number of events that the ingestion engine is to accept within a time period). In an example, each partition may be associated with a respective active rate limit. In an example, each routing key may be associated with a respective active rate limit. In an example, each managed organization may be associated with a respective active rate limit.

Events may be variously formatted messages that reflect the occurrence of events or incidents that have occurred in the computing systems or infrastructures of one or more managed organizations. Such events may include alerts regarding system errors, warning, failure reports, customer service requests, status messages, or the like. Events may be collected by one or more external services and provided to the system 400. Events, as described above may be comprised of SMS messages, HTTP requests/posts, API calls, log file entries, trouble tickets, emails, or the like. An event may include associated information, such as, source, a creation time stamp, a status indicator, more information, fewer information, other information, or a combination thereof, that may be tracked.

The ingestion engine 402 may be arranged to receive the various events and perform various actions, including, filtering, reformatting, information extraction, data normalizing, or the like, or combination thereof, to enable the events to be stored (e.g., queued, etc.) and further processed. In at least one of the various embodiments, the ingestion engine 402 may be arranged to normalize incoming events into a unified common event format. Accordingly, in some embodiments, the ingestion engine 402 may be arranged to employ configuration information, including, rules, templates, maps, dictionaries, or the like, or combination thereof, to normalize the fields and values of incoming events to the common event format. The ingestion engine 402 may assign (e.g., associate, etc.) an ingested timestamp with an accepted event.

In at least one of the various embodiments, the resolution tracker 410 may be arranged to monitor the details regarding how the events are resolved. In some embodiments, this may include tracking life-cycle metrics related to the events (e.g., creation time, acknowledgement time(s), resolution time, processing time,), the resources that are/were responsible for resolving the events, and so on. While FIG. 4 is shown as including one resolution tracker, the disclosure herein is not so limited and the system 400 can include more than one resolution tracker. In an example, different resolution trackers may be configured to receive data from services of one or more partitions. In an example, each partition may have associated with one resolution tracker. Other configurations or mappings between partitions, services, and resolution trackers are possible.

Each of the PID controllers 412A and 412B monitors a pipeline (or a portion thereof) of the system 400, without being part of the pipeline, to determine whether to throttle the rate limit at which the ingestion engine 402 accepts events. A pipeline of the system 400 can be defined as the set of components (e.g., modules, tools, software, processing blocks, etc.) that perform different types of processing or monitoring on an accepted event in order to progress the processing of accepted event from one stage to a next stage until the accepted event is fully processed. As such, in an example, a pipeline of the system 400 that is monitored by the PID controller 412A can include the ingestion engine 402, the partition 404A, one or more of the services 406A and 408A, and the resolution tracker 410. In another example, the portion of the pipeline of the system 400 that is monitored by the PID controller 412A can include the ingestion engine 402 and any other processing blocks (not shown) that may perform processing on an event of a partition prior to handing off the event to (e.g., prior to the event being ready for processing by) one of the services 406A-406B or 408A-408B, as the case may be. More generally, and as mentioned above, what is monitored by the PID controller can depend on the semantics of event completion (i.e., when an event is considered to be completed). It is also noted that that each of the services 406A, 408A, 406B, and 408B are each shown as a single box in FIG. 4 is not intended to be limiting in any way. Each service can itself be a set or a sequence of linear or non-linear blocks or services to be performed on an event.

A PID controller (e.g., the PID controllers 412A and 412B) monitors how events flow through the pipeline (or portions thereof) of the system 400 in order to determine whether the system 400 is performing according to the target lag time, how far behind the target lag time the system 400 is performing, and how quickly the system 400 is recovering toward performing according to the target lag time.

More specifically, a PID controller determines whether the target rate limit should be throttled down by monitoring (e.g., comparing, etc.) the lag times (i.e., measured lag times) of events as compared to the target lag time. The rate limit of the system 400 may be throttled down in situations where the system 400 is not meeting the target lag time criterion. The target rate limit may be throttled down to allow the system 400 to recover (e.g., catch up, etc.) so that the system 400 can again meet the target lag time performance criterion. A PID controller may be configured to use, as an input, an error that is a difference between the average measured lag time and the target lag time. While FIG. 4 includes only one PID controller, the system 400 can include more than one PID controller. For example, one PID controller can be associated with each partition. For example, one PID controller may be associated with one or more routing keys.

In an example, a PID controller (e.g., the PID controller 412B) associated with a partition (e.g., the partition 404B) may obtain (e.g., determine, calculate, select, etc.) one throttled rate limit for the partition. The PID controller transmits (e.g., provides, passes, forwards, communicate, etc.) the throttled rate limit for the partition to the ingestion engine 402. Responsive to receiving an event, the ingestion engine 402 determines whether to accept the event by determining the partition that the event would be assigned to (e.g., forwarded to, placed in, etc.) if accepted, and determines whether the event should be accepted based on the throttled rate limit of the partition. The routing key associated with the event (e.g., a hash therefrom) can be used to determine the partition that the event would be assigned to.

In an example, the system 400 (i.e., a scaling function therein) can obtain respective scaled throttled rate limits for the routing keys of a partition. That is, for each of the routing keys associated with a partition, the system 400 may obtain, using the throttled rate limit, a respective scaled throttled rate limit. In an example, the system 400, and as further described herein, uses a Bezier curve as a scaling function to obtain the scaled throttled rate limits. The PID controllers 412A and 412B and the scaling function are further described with respect to FIG. 5.

The notification engine 418 may be arranged to generate notification messages, for least some of the accepted events. The notification messages may be transmitted to responsible users, teams, automated systems, and the like. The notification engine 418 may select a messaging provider that may be used to deliver a notification message to the responsible resource. The notification engine 418 may determine which resource is responsible for handling the event message and may generate one or more notification messages and determine particular message providers to use to send the notification message.

In at least one of the various embodiments, the system 400 may include various user-interfaces or configuration information (not shown) that enable organizations to establish how events should be resolved. Accordingly, an organization may define, rules, conditions, priority levels, notification rules, escalation rules, routing keys, or the like, or combination thereof, that may be associated with different types of events. For example, some events may be informational rather than associated with a critical failure. Accordingly, an organization may establish different rules or other handling mechanics for the different types of events. For example, in some embodiments, critical events may require immediate (e.g., within the target lag time) notification of a response user to resolve the underlying cause of the event. In other cases, the events may simply be recorded for future analysis.

Figure 5:
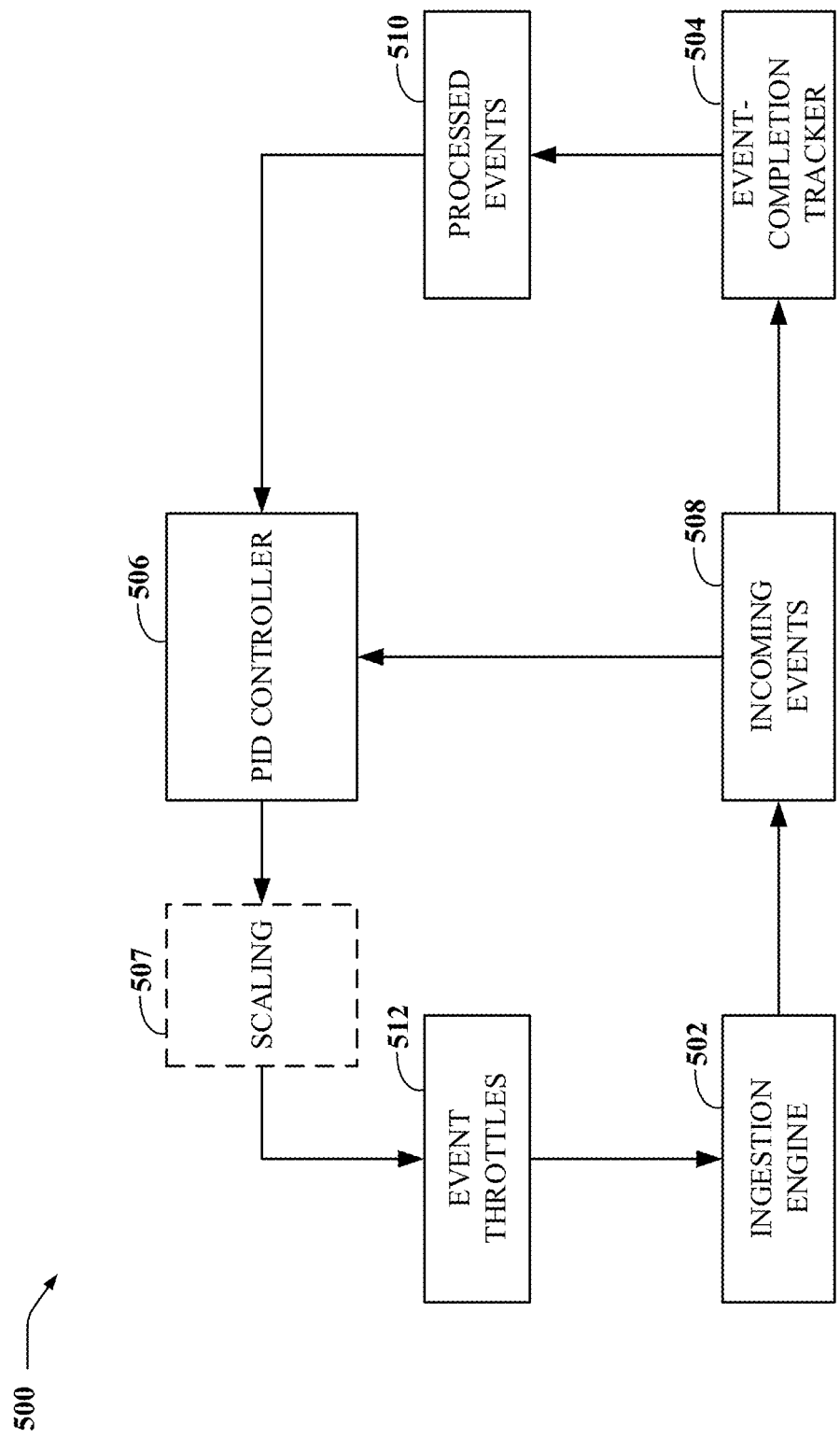
FIG. 5 is an example of a configuration of a system that includes a PID controller for throttling a target ingestion rate.

FIG. 5 is an example of a configuration of a system 500 that includes a PID controller for throttling a target ingestion rate. The system 500 includes an ingestion engine 502 (which can be the ingestion engine 402 of FIG. 4), an event-completion tracker 504 (which can be one of the event-completion trackers 405A-405D of FIG. 4), and a PID controller 506 (which can be one of the PID controller 412A or the PID controller 412B of FIG. 4). In some implementations, the system 500 can further include a scaling function 507. The PID controller 506 (i.e., operations thereof) and the scaling function 507 are further described with respect to FIG. 6. An incoming events 508 is used by the ingestion engine 502 to communicate data regarding accepted events. A processed events 510 is used by the event-completion tracker 504 to, inter alia, communicate data regarding the completion of the processing of events. An events throttles 512 is used by the PID controller 506 to communicate data regarding throttling values to the ingestion engine 502.

Each of the incoming events 508, the processed events 510, and the events throttles 512 may be or may be implemented using a database, a data feed, an asynchronous communications channel, a messaging queue, some other mechanism, or a combination thereof. Regardless of the implementation, the ingestion engine 502 produces (e.g., generates, writes, etc.) data related to accepted events that are consumed (e.g., read, used, examined, interrogated, etc.) by the event-completion tracker 504 and the PID controller 506; the event-completion tracker 504 produces data related to processed events that are consumed by the PID controller 506; and the PID controller 506 produces event throttling data that are consumed by the ingestion engine 502. In an example, the throttling data produced by the PID controller 506 may be further scaled using the scaling function 507 to obtain routing-key specific scaled throttling data, which are then consumed by the ingestion engine 502.

Responsive to accepting an event, the ingestion engine 502 associates an ingested timestamp with the event. The ingested timestamp (i.e., ingested_ts) can be communicated to the PID controller 506 via the incoming events 508. In an example, the incoming events 508 can include an accepted event and the PID controller 506 can obtain data of or related to the accepted event to determine the ingested timestamp of the event by accessing (e.g., querying, interrogating, receiving notifications from, etc.) the incoming events 508.

Responsive to determining that processing of an event is completed, the event-completion tracker associates a processing-complete timestamp (i.e., completed_ts) with an event. The processing-complete timestamp can be communicated to the PID controller 506 via the processed events 510. In an example, the processed events 510 can include a processed event and the PID controller 506 can obtain data of or related to the processed event to determine the processing-complete timestamp of the event by accessing (e.g., querying, interrogating, receiving notifications from, etc.) the processed events 510. The PID controller 506 can correlate events in the incoming events 508 and the processed events 510 using the unique identifiers associated with events.

In some implementations, the event-completion tracker 504 can associate a processing-start timestamp (i.e., started_ts) with an event when processing (such as by a very first service of the pipeline) of the event starts. That is, the processing-start timestamp is the time that the event is no longer waiting in a queue (e.g., a partition) for processing. Rather the processing-start timestamp is the start of the processing. The processing-start timestamp of an event can be communicated to the PID controller 506 via the processed events 510. Events included in the processed events 510 but do not have associated processing-complete timestamp are referred to herein as in-flight events.

The PID controller 506, as needed, determines one or more throttling values, which may be communicated (as is or after scaling, depending on the implementation) to the ingestion engine 502 via the event throttles 512. The PID controller 506 can also determine respective throttling durations for the one or more throttling values. The throttling durations can also be communicated to the ingestion engine 502 via the event throttles 512. In an example, the throttling durations can be set to a default throttling value. In an example, the default throttling value can be 5 minutes. However, other default throttling durations are possible.

In an example, the PID controller 506 can determine that the incoming events 508 includes events the processing of which have not started and are likely to require, in total, more than a maximum accumulated processing time (e.g., 10 minutes, 15 minutes, etc.). If at least a maximum accumulated processing time of processing has been accumulated, accepting more and more events for processing would cause the system 400 of FIG. 4 to further fall behind or at least delays the recovery time of the system 400. As such, it is desirable to temporarily stop accepting events. By blocking new events, the freshest (i.e., most recent, etc.) received events have a better chance of being processed more quickly once the system 400 has recovered.

In an example, the PID controller 506 can identify events the processing of which has not started by examining the processing-start timestamp associated with events of the incoming events 508. Other ways of identifying such events are possible. The PID controller 506 can use heuristics, rules, data analysis, and the like to determine (e.g., estimate, etc.) whether the processing of such events is likely to require more than the maximum accumulated processing time. To illustrate, and using a non-limiting example of a heuristic, the processing can be determined to require more than the maximum accumulated processing time responsive to a determination that a threshold number of events (e.g., 5000 events, or some other threshold number of events) are queued for processing at a partition. In another example, a threshold number of processing capacity of in-flight events of a partition (e.g., 1000 events/minute) can be used to determine whether more than the maximum accumulated processing time is reached.

In the case that the PID controller 506 determines that more than the maximum accumulated processing time is required, the PID controller 506 can direct the ingestion engine 502 to stop accepting additional events for the partition for the throttling duration. That is, responsive to determining that an accumulated pending processing time of in process events is greater than a maximum accumulated processing time, the PID controller directs the ingestion engine to stop the acceptance of events.

In an example, the PID controller 506 can direct the ingestion engine 502 to stop accepting additional events by emitting an explicit instruction directing the ingestion engine to stop accepting additional events. In an example, the PID controller 506 can direct the ingestion engine 502 to stop accepting additional events by emitting throttling values of 0 for each of the routing keys. The PID controller 506 continues to emit throttling values of 0 as needed (e.g., with every execution of the PID controller 506) until the PID controller 506 determines that the processing of such back-logged events is not likely to require more than the maximum accumulated processing time. As can be appreciated based on the foregoing, it is possible that ingestion on/for one partition may be stopped while ingestion continues on/for another partition.

Figure 6:
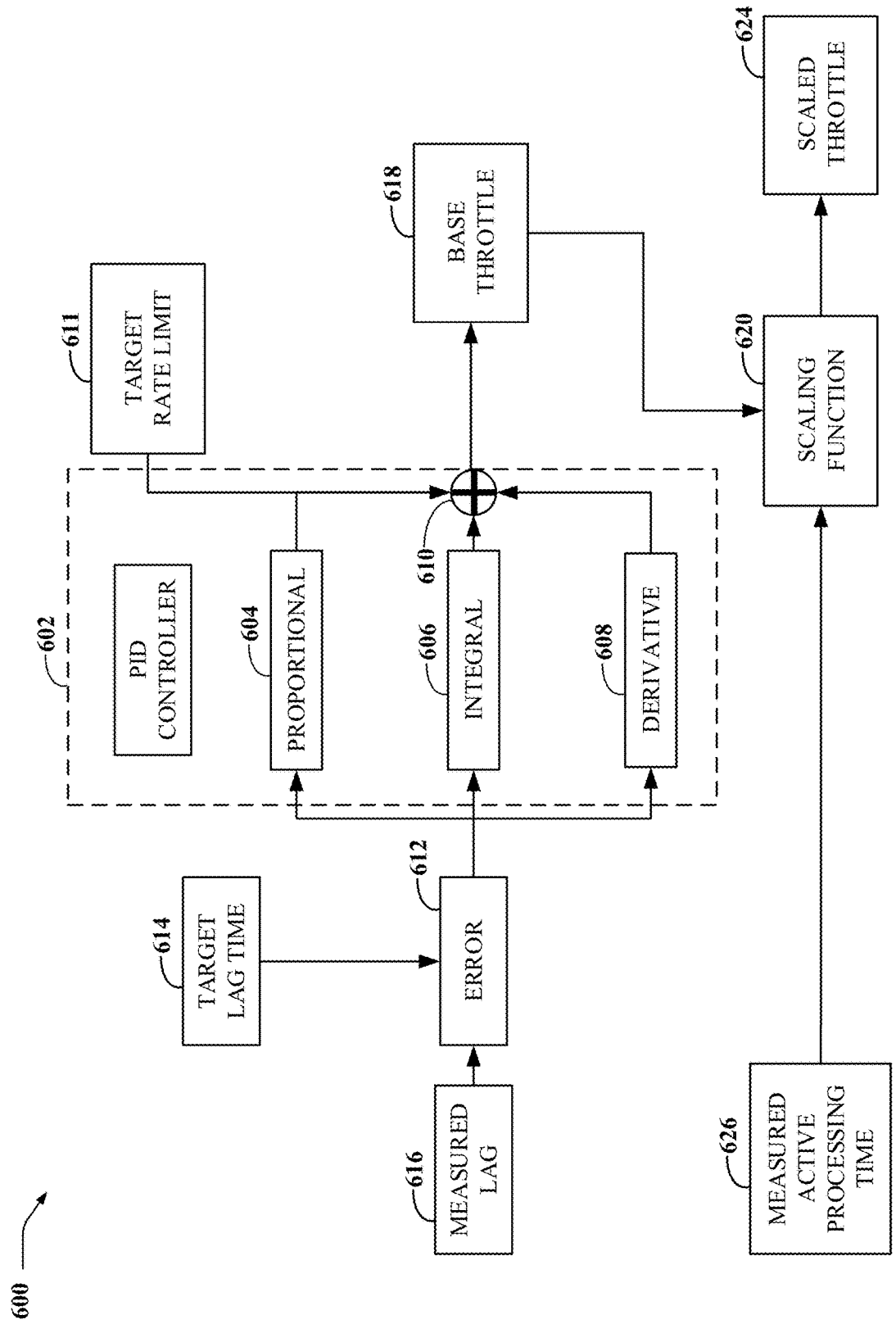
FIG. 6 is a diagram of an example of operations of a PID controller for throttling event ingestion.

FIG. 6 is a diagram of an example 600 of operations of a PID controller for throttling event ingestion. The example 600 includes a PID controller 602. The PID controller 602 calculates throttles for a target rate limit 611 so that an event ingestion and processing system, such as the system 400 of FIG. 4, operates close to a desired state, such as a target lag time (i.e., a set point of the PID controller). The target lag time can be a maximum allowable amount of time for the system 400 to finish processing an event after the event is accepted. The operations of the PID controller are described with respect to throttling a target rate limit for a partition that may include events corresponding to multiple routing keys.

The PID controller 602 can be implemented, for example, as a software program that may be executed by computing devices such as the network computer 300 of FIG. 3. The software program can include machine-readable instructions that may be stored in a memory such as the memory 304, the processor-readable stationary storage device 334, or the processor-readable removable storage device 336 of FIG. 3, and that, when executed by a processor, such as the processor 302 of FIG. 3, may cause the computing device to perform the operations of the PID controller 602. The PID controller 602 can be implemented using specialized hardware or firmware. Multiple processors, memories, or both, may be used.

As already described, the PID controller 602 is a proportional-integral-derivative controller that dynamically throttles the target rate limit 611. As such, the PID controller 602 includes a proportional control 604, an integral control 606, and a derivative control 608 that calculate, respectively, a proportional part, an integral part, and a derivative part.

The PID controller can be configured to execute at a certain frequency (e.g., every 1 minute or some other frequency). The PID controller may calculate and output a base throttle 618 when the PID controller 602 executes. In an example, if the PID controller 602 determines that the system 400 is operating below the target lag time 614, then the PID controller 602 does not output a base throttle.

The PID controller 602 calculates an error value as a difference between a target lag time 614 and an average measured lag time 616, according to formula (1). The average measured lag time 616 can be the average event ingestion time of all events processed by the system 400. The average measured lag time 616 can be calculated according to formula (2). In an example, less than all of the processed events may be used to obtain the error. For example, a number of events processed in a processing window (e.g., 1 hour, 2 hours, 1 day, etc.) may be used. For example, a most recent number of events (e.g., the more recent 1000, 2000, or some other number of events) can be used.

$$\text{error} = \text{target\_lag\_time} - \text{average\_measured\_lag\_time} \quad (1)$$

$$\text{average\_measured\_lag\_time} = \frac{\sum_{i=1}^{\#\,processed\,events}(\text{completed\_ts}_i - \text{ingested\_ts}_i)}{\#\,\text{processsed events}} \quad (2)$$

The PID controller 602 maintains (e.g., remembers, stores, etc.) past calculated errors (or aggregations thereof) for a lookback window of time. In an example, the lookback window of time can be 3 minutes. However, other lookback window durations are possible. The PID controller 602 can also accumulate (e.g., sums) past errors, such as in a variable accurnulated_past_error. The PID controller 602 accumulates past errors over a sliding window of time. In an example, the sliding window of time can be the same as the lookback window of time. The past calculated errors and the accumulated past errors are used by the integral control 606 and the derivative control 608, as described herein.

The PID controller 602 calculates the base throttle 618 as a sum 610 of a PID value (i.e., u(t)) and the target rate limit 611. The PID value can be obtained as a sum of the proportional part, the integral part, and the derivative part, as shown in formula (3).

$$u(t) = (\text{proportional part}) + (\text{integral part}) + (\text{derivative part}) \quad (3)$$

The proportional control 604 part is stateless and does not use previously calculated error values. The proportional part can be calculated as a multiplier of the error using formula (4), where $K_p$ is a proportional control constant.

$$\text{proportional part} = K_p * (\text{error}) \quad (4)$$

The integral control 606 attempts to bring the measured lag time lower. To illustrate, assume that even though the proportional control 604 and the derivative control 608 are active, the measured lag time remains at 2.5 minutes (e.g., 0.5 minutes greater than the target lag time). As such, the integral control 606 contributes to the throttling based on the fact that the system 400 remains behind. As mentioned above, the PID controller 602 is one-directional controller in that the PID controller 602 minimizes processing lag. As such, the PID controller 602 does not accumulate positive error as accumulating positive error would result in the integral portion slowing the reaction time of the system 400 when the target lag time is crossed. The integral part can be calculated using formula (5), where $K_i$ is an integral control constant.

$$\text{integral part} = K_i * (\min(\text{accumulated\_past\_error} + \text{error}, 0)) \quad (5)$$

The derivative control 608 determines how quickly the system 400 is approaching the target lag time. To illustrate, if the measured lag time is increasing from 0 minutes to two minutes (i.e., the target lag time) over the course of two minutes, the derivative control 608 starts throttling just before the lag time hits two minutes so that that the measured lag time does not increase above the target lag time and remains at or below the 2 minute target lag time. As mentioned above, the derivative control avoids derivative kick by calculating the derivative part using a moving average over a run interval (e.g., 3 minutes) of error values as opposed to only the immediately preceding error value. The derivative part can be calculated using formula (6), where $K_d$ is an derivative control constant. In formula (6), previous_avg_error is the previously accumulated average error and current_avg_error is the average accumulated error that includes the errors associated with the events processed since the last execution of the PID controller 602.

$$\text{derivative part} = K_d(\text{current\_avg\_error} - \text{previous\_avg\_error}) \quad (6)$$

The proportional control constant $K_p$, the integral control constant $K_i$, and the derivative control constant $K_d$ can be empirically derived. For example, historical event processing data of a system that does not include the PID controller 602 can be used to tune the performance of the PID controller 602 to obtain desired results. For example, event frequency data, created timestamps, processed timestamps, processing durations, queuing durations, and the like can be analyzed and events replayed using the PID controller 602, while in training, to arrive at optimal values for the constant $K_p$, $K_i$, and $K_d$.

In an example, the base throttle 618 can be transmitted to the ingestion engine 502 of FIG. 5 via the event throttles 512 of FIG. 5. While not specifically shown, and as mentioned above, the PID controller 506 can be associated with a partition. As such, the ingestion engine 502 can be configured to accept events for further processing for the partition according to the base throttle 618. To reiterate, the base throttle 618 can represent the maximum number of events per minute that are to be accepted for the partition. In an example, the PID controller 602 can further scale the base throttle 618 to obtain a scaled throttled rate limit 624 for a routing key of the partition. Scaling the base throttle 618 can result in a fairer throttling behavior, whereby a routing key (e.g., events from a first managed organization) that contributes more to the performance degradation is throttled more harshly than a routing key (e.g., events from a second managed organization) that contributes less to the performance degradation.

In an implementation, a scaling function 620, which can be the scaling function 507 of FIG. 5, can be used to obtain the scaled throttled rate limit 624. The scaled throttled rate limit 624 for a routing key can be obtained based on the processing times of events associated with the routing key as compared to the processing times of events of the partition or the processing times of events of other routing keys of the partition. The processing times of events associated with the routing key, the processing times of events of the partition, and the processing times of events of other routing keys of the partition can be obtained from a measured active processing time 626.

Several techniques for obtaining the scaled throttled rate limits are possible. In an example, the scaled throttled rate limit for a routing key can be obtained based on a proportion of a deviation of the processing times of the events of the routing key to the processing times of all events of the partition. In an example, the scaled throttled rate limit for a routing key can be obtained by comparing an average processing time of events associated with the routing key to the average processing times of events associated with the other routing keys of the partition. In an example, a scaled throttled rate limit for a routing key can be obtained as described with respect to FIG. 7.

Figure 7:
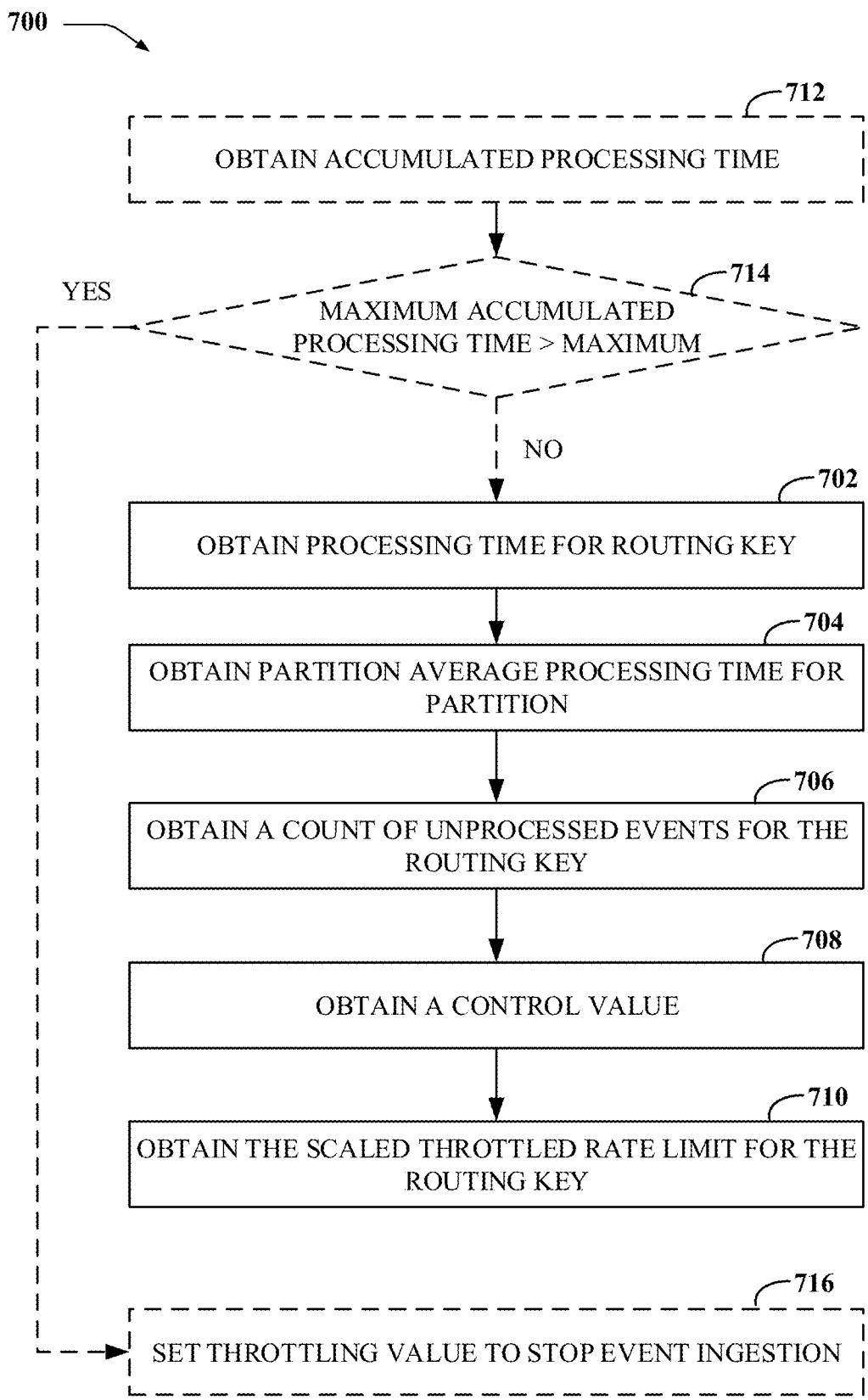
FIG. 7 is a flowchart of an example of a technique for obtaining a throttled rate limit for a routing key.

FIG. 7 is a flowchart of an example of a technique 700 for obtaining a scaled throttled rate limit for a routing key. The technique 700 uses a quadratic Bézier curve where the endpoints ($P_0$ and $P_2$) are 0 and 1, and a middle point ($P_1$) is a control value that is between 0 and 1 and calculated based on the disproportionality of the active processing time of the events of the routing key as compared to the average active processing time on the partition. It is noted that active processing time can only be effectively calculated for fully-processed events. Unprocessed or partially-processed events have an unknown processing time. Stated another way, an active processing time can only be calculated for events where the respective processing-complete timestamps are set.

At 702, the technique 700 obtains a processing time (i.e., processing time) for (i.e., per) the routing key. In an example, processing times of all processed events associated with the routing key are obtained. That is, the technique 700 can sum (e.g., add) the processing times of all the processed events that are associated with the routing key. The processing time of an event can be obtained as the difference between the processing-complete timestamp and the a processing-start timestamp of the event: completed_ts-started_ts. In another example, the processing time can be obtained for less than all of the processed events. For example, the technique 700 may obtain the processing time of all events processed within a specified period of time or may obtain the processing time of a specified number of processed events. In an example, the processing time for the routing key can be obtained (e.g., calculated, etc.) over a sliding window (e.g., 3-minute sliding window or some other sliding window).

At 704, the technique 700 obtains partition average processing time (i.e., partition_avg_processing_time) for the partition. The technique 700 obtains the partition average processing time for a period or a number of events corresponding to that used to obtain the processing time for the routing key. In an example, the partition average processing time can be obtained for the partition over the same sliding widow used to obtain the processing time for the routing key at 702. As such, the average processing time (i.e., partition_avg_processing_time) for the partition can be the arithmetic mean of all processing times of the active routing keys of the partition. In an implementation, the active routing keys of the partition can be or can include all routing keys with completed events within the sliding window. At 706, the technique 700 obtains a number (i.e., lagging_routing_key_count) of routing keys for which the processing time meets a certain criterion. In an example, the certain criterion can be that the average processing time per routing key is greater than the average processing time of the partition by a factor (e.g., 1.5).

At 708, the technique 700 obtains the control value. The control value can indicate the degree to which the routing key from the average processing time on the partition. Said another way, the control value can indicate the degree to which the processing of events corresponding to the routing key deviates from the average processing time of events on the partition. The control value (i.e., control_value) can be calculated using formula (7).

$$\text{control\_value} = \frac{\text{processing\_time}}{(\text{processing\_time} + \text{partition\_avg\_processing\_time})} \quad (7)$$

A control value that is less than 0.5 indicates that the average processing time of events associated with the routing key is less than the average processing time for the partition, and a control value greater than 0.5 indicates that the average processing time of events associated with the routing key is greater than the average processing time for the partition.

At 710, the technique 700 obtains the scaled throttled rate limit for the routing key. If the control value is less than 0.5 and the lagging_routing_key_count is greater than 0, then the technique 700 uses the target rate limit for the partition (i.e., all routing keys of the partition). A control value that is less than 0.5 can indicate that the routing key has a minimal effect on the partition. As such, no throttling or scaling is performed in order to diminish the variance of rate limits given to the routing keys or managed organizations.

If the control value is equal to 0.5, then the scaled throttled rate limit can be set to the base throttle. A control value of 0.5 can indicate that the processing time of the routing key is average as compared to the processing times of other routing keys of the partition. If the control value is greater than 0.5 or the control value is less than 0.5 but lagging_routing_key_count is equal to zero, then a quadratic Bezier curve (or some other curve or scaling function) can be used to obtain the scaled throttled rate limit. A control value that is above 0.5 for a routing key can indicate that the routing key is taking (e.g., using, consuming, etc.) more processing time than the other routing keys on the partition and the throttled rate limit should accordingly be scaled for the routing key. In the case where there are no particular routing keys that are lagging significantly, the routing key cannot be said to be causing the delays and no scaling of the throttled rate limit may be performed or is necessary for the routing key. Given the base throttle, the technique 700 finds a closest x-value corresponding to a position on the curve and then uses the corresponding y-value as the scaled throttle rate limit. The position on the curve (t) can be calculated using formula (8), where b is the base throttle 618 of FIG. 6, c is the control value, and r is the target rate limit. The scaled throttled rate limit (i.e., the y-axis value) is then obtained using formula (9).

$$t = \frac{-2rc + \sqrt{4r^2c^2 + 4br(1-2c)}}{2r(1-2c)} \quad (8)$$

$$\text{scaled rate limit} = \text{round}\left(r * \left((1 - 2(1-c))t^2 + 2(1-c)t\right)\right) \quad (9)$$

In an example, a minimum scaled throttled rate limit (i.e., min_scaled) is output. In an example, the minimum scaled throttling value may be 1. As such, the scaled throttled rate limit can be set to:

$$\text{scaled rate limit} = \max(\text{scaled rate limit}, \text{min\_scaled}) \quad (10)$$

In an example, the technique 700 can further include determining whether ingestion of events should be temporarily stopped. In an example, such as determination can be made at the end of the technique 700, such as after 710. In an example, such a determination can be made, as shown and further described herein, before step 702 is performed.

At 712, the technique 700 obtains (e.g., estimates, calculates, infers, etc.) an accumulated processing time, as described herein. At 714, the technique 700 determines whether the accumulated processing time is greater than a maximum accumulated processing time. If the accumulated processing time is greater than a maximum accumulated processing time, then the technique 700 proceeds to 716; otherwise the technique 700 proceeds to 702. At 716 the technique 700 sets the throttling value such that event ingestion is stopped.

Figure 8:
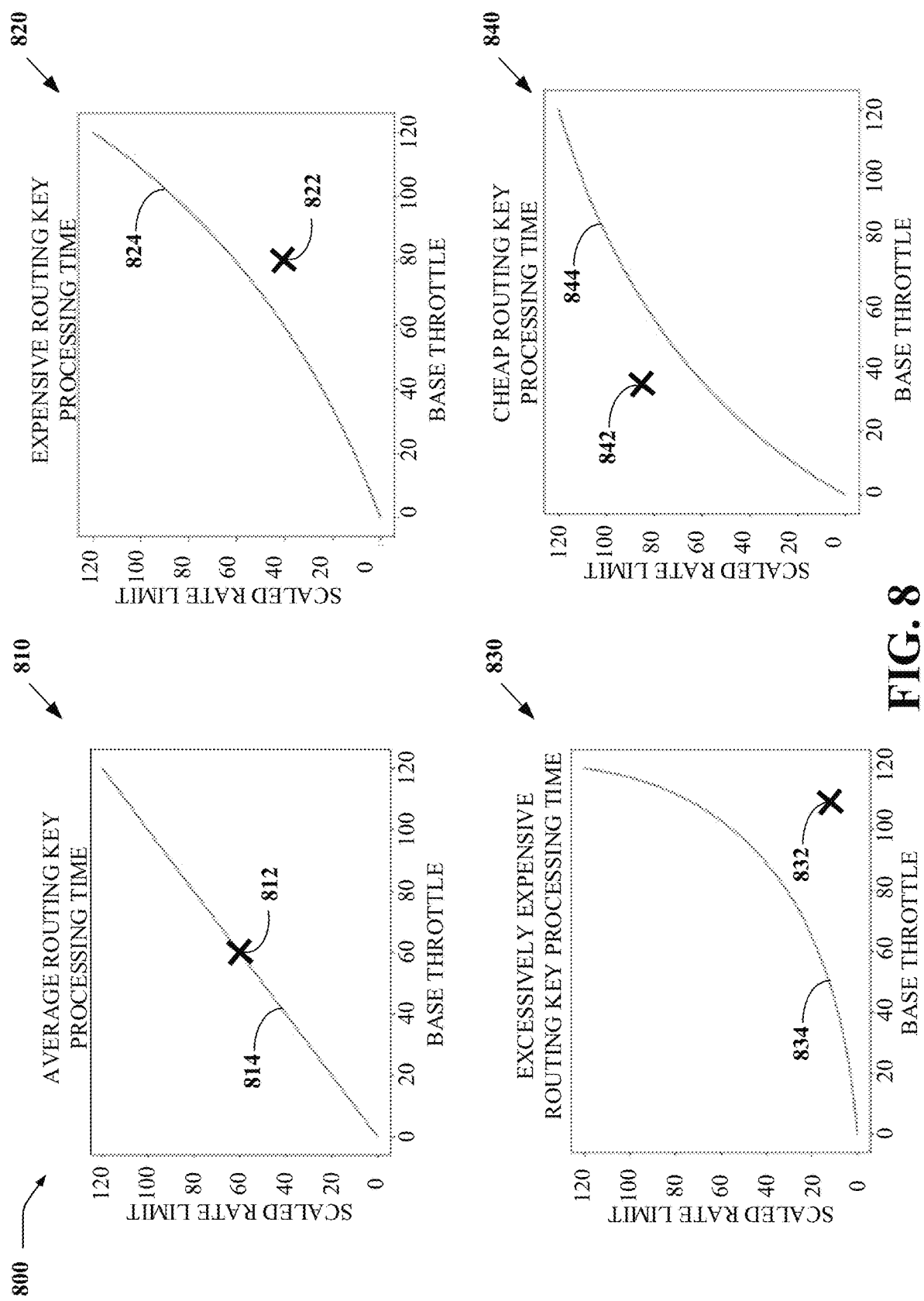
FIG. 8 illustrates examples of effects of a quadratic Bezier curve on scaled throttled rate limits.

FIG. 8 illustrates examples 800 of effects of a quadratic Bezier curve on scaled throttled rate limits. Plots 810, 820, 830, and 840 illustrate graphs of base throttle values (such as the base throttles 618 of FIG. 6) on the x-axes and the scaled throttled rate limits (such as the scaled throttled rate limit 624 of FIG. 6) on the y-axes. The control values 812, 822, 832, and 842 illustrate examples of control values (as described with respect to FIG. 7). The control values 812, 822, 832, and 842 result in (e.g., control the shape of, etc.) curves 814, 824, 834, and 844, respectively. In the plots 810, 820, 830, and 840, the target rate limit is 120 events per minute (as illustrated by the maximum values on the x- and y-axes).

The plot 810 illustrates the case where the control value 812 is equal to 0.5. In such as case, no scaling of the base throttle is performed and the scaled throttled rate limit is set to the base throttle. The plot 820 illustrates the case where, on aggregate (e.g., on average), events associated with a routing key are more expensive to process than the average processing time of all events of the partition. The plot 820 illustrates the case where the control value 822 is greater than 0.5 indicating that the events of the routing key are more expensive to process than all events of the partition. As such, the base throttle is mapped to a scaled throttled rate limit according to the curve 824. For example, whereas the base throttle may be 100, the scaled throttled rate limit 624 for the routing key would be approximately 85.

The plot 830 illustrates the case where the control value 832 is significantly greater than 0.5 indicating that the events of the routing key are even more expensive to process than those of the plot 820. As such, the base throttle is mapped to a scaled throttled rate limit according to the curve 834. For example, whereas the base throttle may be 100, the scaled throttled rate limit 624 for the routing key would be approximately 40. The plot 840 illustrates the case where the control value 842 is less than 0.5 indicating that the events of the routing key are less expensive to process than all events of the partition. As such, the base throttle is mapped to a scaled throttled rate limit according to the curve 844. For example, whereas the base throttle may be 100, the scaled throttled rate limit 624 for the routing key would be approximately 110.

Figure 9:
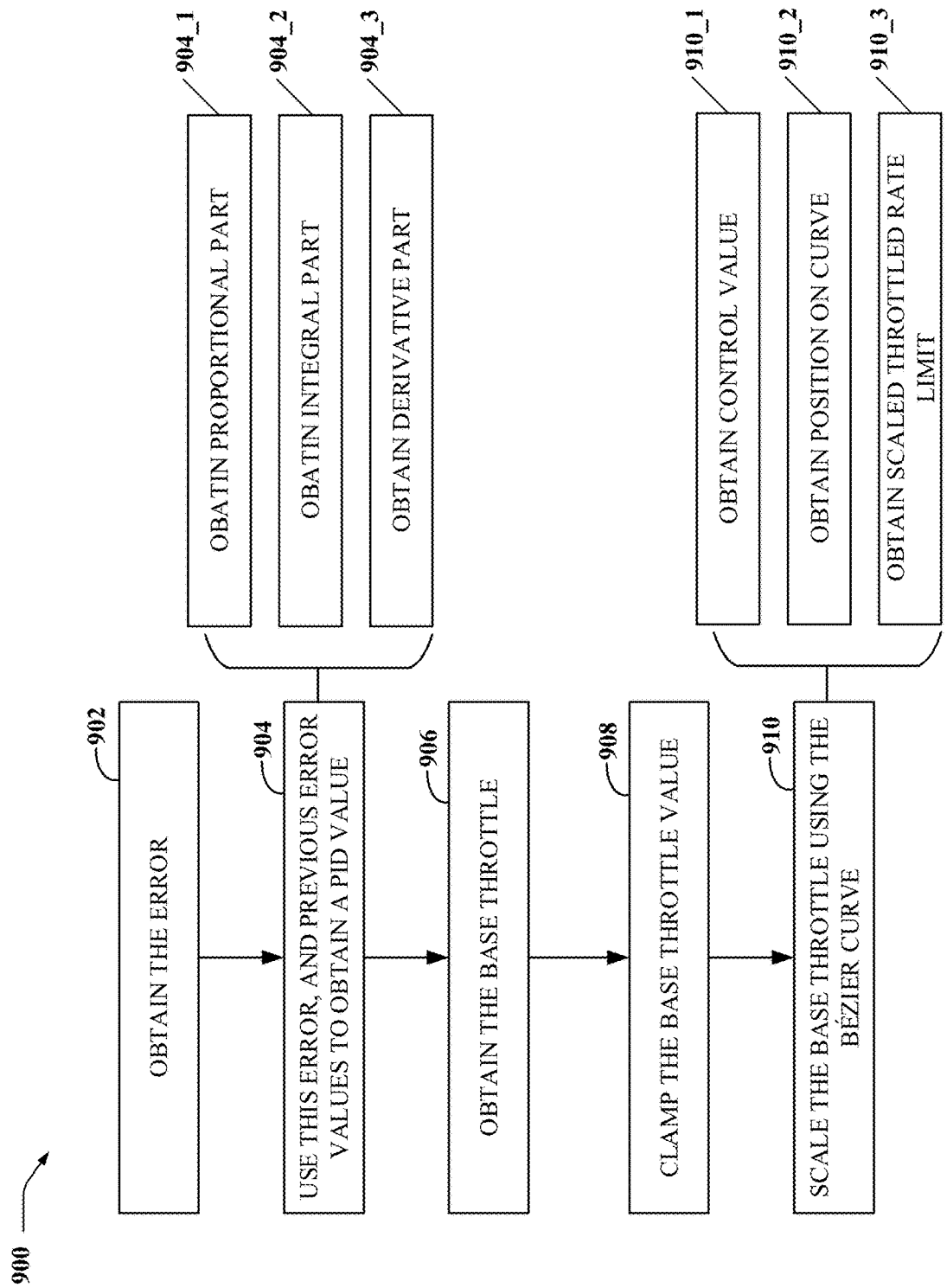
FIG. 9 is a flowchart of an example of a technique for throttling event ingestion.

According to the foregoing, FIG. 9 is a flowchart of an example of a technique 900 for throttling event ingestion. The technique 900 can be implemented in an event management bus, such as the system 400 of FIG. 4 or the system 500 of FIG. 5, that is configured to process events, which are ingested at a target rate limit and at a desired target lag time. The technique 900 can be regularly executed (such as every 1, minute, 2 minutes, or some other interval) to determine whether the target rate limit should be throttled and to obtain scaled throttled rate limits per routing keys. The technique 900 throttles the rate limit in response to determining that the EMB is not performing according to the target lag time in order to allow the EMB to recover so that the EMB can again perform according to the target lag time.

The technique 900 can be implemented, at least partially, by a PID controller. The technique 900 can be implemented, at least partially, by or using a scaling function, such as the scaling function 507 of FIG. 5. The technique 900 can be implemented, for example, as a software program that may be executed by computing devices such as the network computer 300 of FIG. 3. The software program can include machine-readable instructions that may be stored in a memory such as the memory 304, the processor-readable stationary storage device 334, or the processor-readable removable storage device 336 of FIG. 3, and that, when executed by a processor, such as the processor 302 of FIG. 3, may cause the computing device to perform the operations of the technique 900. The technique 900 can be implemented using specialized hardware or firmware. Multiple processors, memories, or both, may be used.

At 902, the technique 900 obtains (e.g., calculates, selects, determines, etc.) an error. The error can be obtained as described with respect to formula (1). As such, the error can be calculated as a difference between the target lag time and an average measured lag time of events of the partition. In an example, the average measured lag time can be calculated for all events of the partition that have been processed. In an example, the average measured lag time can be calculated for a subset of all events of the partition that have been processed.

At 904, the technique 900 uses the error, and previous error values, to obtain a PID value, as described above. The PID value is the sum of PID parts. Obtaining the PID value includes obtaining, 904_1, a proportional part; obtaining, 904_2, an integral part; and obtaining 904_3, a derivative part. The proportional part can be obtained as the error multiplied by the proportional control constant, as described with respect to formula (4). The integral part can be obtained as the sum of accumulated errors multiplied by an integral control constant, as described with respect to formula (5). The derivative part can be obtained as a current accumulated error value minus a previous accumulated error value, divided by a run interval, and multiplied by a derivative control constant, as described with respect to formula (6). The PID value can be obtained as the sum of the proportional part, the integral part, and the derivative part. It is noted that, as calculated, the PID value may be a non-positive value. While not specifically shown in FIG. 9, if the PID value is a positive value, then not throttling is performed and the technique 900 ends.

At 906, the technique 900 obtains a base throttle by adding the PID parts together and adding the sum of the PID parts (i.e., the PID value) to the target rate limit. At 908, the base throttle is clamped to be between a minimum of 1 and a maximum value that the target rate limit.

At 910, the technique 900 obtains a respective scaled throttled rate limit for each routing key. Obtaining a scaled throttled rate limit for a routing key includes obtaining, at 910_1, a control value as an active processing time divided by the sum of the active processing time and the average active processing time for the partition, as described with respect to formula (7); obtaining, at 910_2 and using the base throttle, the control value, and the target rate limit, a position on a Bezier curve, as described with respect to formula (8); and obtaining, at 910_3 and using the position on the curve, the target rate limit, and the control value, the scaled throttled rate limit, as described with respect to formula (9).

Figure 10:
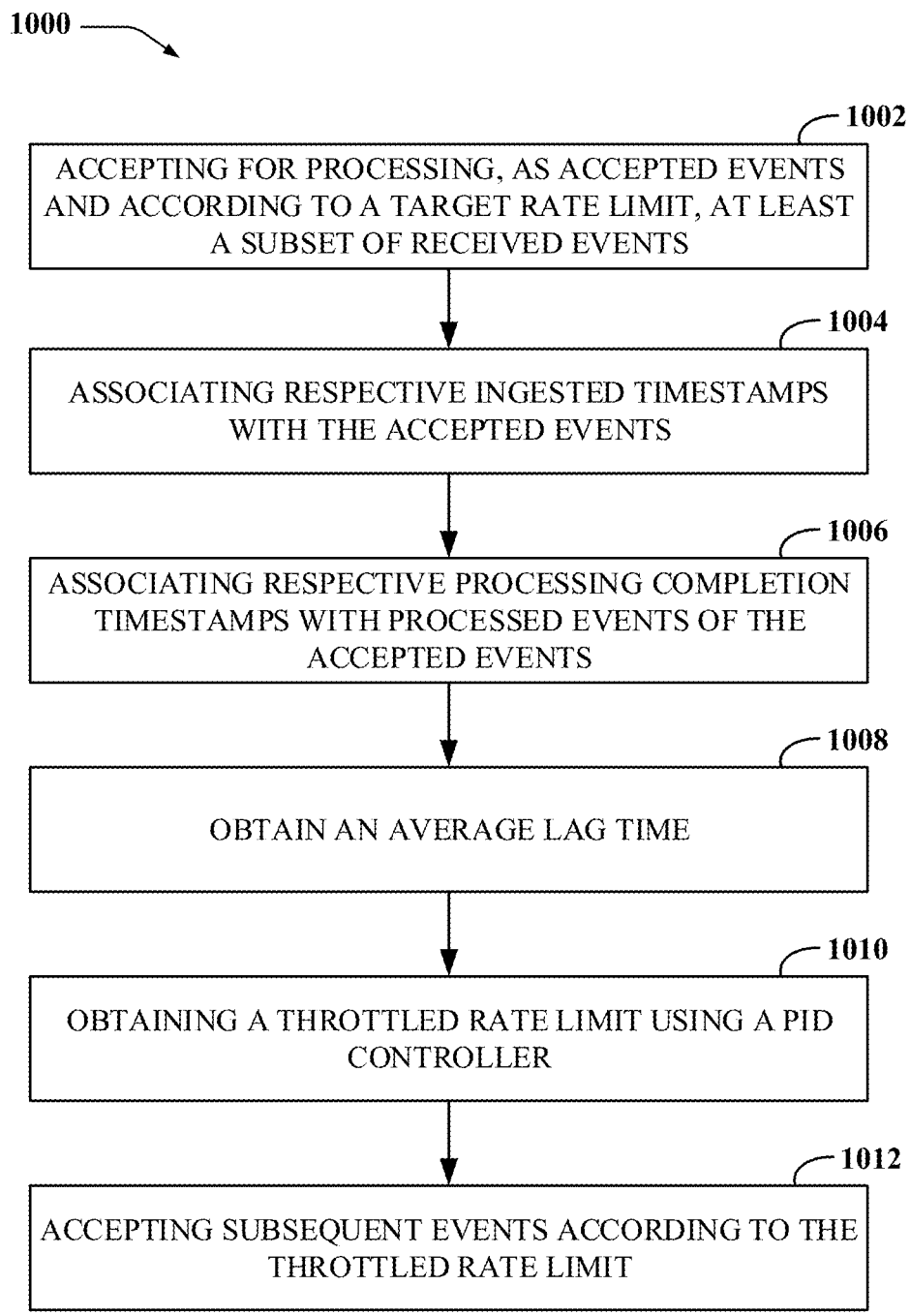
FIG. 10 is a flowchart of another example of a technique for throttling event ingestion.

FIG. 10 is a flowchart of another example of a technique 1000 for throttling event ingestion. The technique 1000 can be implemented in an event management bus, such as the system 400 of FIG. 4 or the system 500 of FIG. 5, that is configured to process events, which are ingested at a target rate limit, at a desired target lag time. The technique 1000 can be regularly executed (such as every 1, minute, 2 minutes, or some other interval) to determine whether the target rate limit should be throttled and to obtain scaled throttled rate limits per routing keys. The technique 900 throttles the rate limit in response to determining that the EMB is not performing according to the target lag time in order to allow the EMB to recover so that the EMB can again perform according to the target lag time.

The technique 900 can be implemented, at least partially, by a PID controller. The technique 1000 can be implemented, for example, as a software program that may be executed by computing devices such as the network computer 300 of FIG. 3. The software program can include machine-readable instructions that may be stored in a memory such as the memory 304, the processor-readable stationary storage device 334, or the processor-readable removable storage device 336 of FIG. 3, and that, when executed by a processor, such as the processor 302 of FIG. 3, may cause the computing device to perform the operations of the technique 1000. The technique 1000 can be implemented using specialized hardware or firmware. Multiple processors, memories, or both, may be used.

At 1002, the technique 1000 accepts for processing, as accepted events and according to a target rate limit, at least a subset of received events, as described above. At 1004, the technique 1000 associates respective ingested timestamps with the accepted events, such as described with respect to the incoming events 508 of FIG. 5. That is, for each accepted event, the technique 1000 assigns an ingested timestamp. At 1006, the technique 1000 associates respective processing completion timestamps with processed events of the accepted events, such as described with respect to the processed events 510 of FIG. 5. That is, responsive to completing processing of an event, the technique 1000 associates, with the event, the time of completion of the processing of the event.

At 1008, the technique obtains an average measured lag time using at least a subset of the respective processing completion timestamps and corresponding respective ingested timestamps, as described with respect to the average measured lag time 616 of FIG. 6. In an example, the technique 1000 may obtain the average measured lag time from another engine or component of the system 400. In an example, the system 400 can itself calculate the average measured lag time.

At 1010, the technique 1000 obtains a throttled rate limit using a PID controller. As described herein, the PID controller is configured to use, as an input, an error value that is a difference between a target lag time and the average measured lag time. As also described herein, an integral part of the PID is set to zero responsive to an accumulated average lag time being less than the target lag time. In an example, the throttled rate limit can be clamped to a value that is greater than or equal to 1 and less than or equal to the target rate limit. At 1012, the technique 1000 accepts subsequent events according to the throttled rate limit.

In an example, the technique 1000 can further include, responsive to determining that an accumulated pending processing time of in process events is greater than a maximum accumulated processing time, stopping acceptance of events.

In an example, the accepted events correspond to at least two or more routing keys and the technique 1000 further includes scaling, such as by a scaling function, the throttled rate limit to obtain respective scaled throttled rate limits for the at least two or more routing keys. In an example, accepting the subsequent events according to the throttled rate limit can include accepting first subsequent events corresponding to a first routing key according to a first scaled throttled rate limit, and accepting second subsequent events corresponding to a second routing key according to a second scaled throttled rate limit that is different from the first scaled throttled rate limit. The first subsequent events corresponding to the first routing key and the second subsequent events corresponding to the second routing key are accepted according to the first scaled throttled rate limit and the second scaled throttled rate limit, respectively, for a throttling duration. In an example, scaling the throttled rate limit to obtain the respective scaled throttled rate limits for the at least two or more routing keys can include scaling the throttled rate limit for a routing key based on a deviation amount of first processing time of events corresponding to the routing key from an average processing time of the accepted events. In an example, the throttled rate limit is scaled using a quadratic Bezier curve.

For simplicity of explanation, the techniques 700, 900, and 1000 of FIGS. 7, 9, and 10, respectively, are depicted and described herein as respective series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage devices and be stored on and executed by one or more general purpose computers, thus creating a special purpose computer configured to provide the engine.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for event processing, comprising:
    accepting for processing, as accepted events and according to a target rate limit that indicates a maximum number of events to be accepted for processing, at least a subset of received events;
    associating respective ingested timestamps with the accepted events, wherein an ingested timestamp of an accepted event indicates a time of accepting the accepted event for further processing;
    associating respective processing completion timestamps with processed events of the accepted events;
    determining an average measured lag time using at least a subset of the respective processing completion timestamps and corresponding respective ingested timestamps;
    obtaining a throttled rate limit using a proportional-integral-derivative (PID) controller,
        wherein the PID controller is configured to use, as an input, an error value that is a difference between a target lag time indicative of a desired time of processing events and the average measured lag time indicative of an average of actual times of processing events, and
        wherein an integral part of the PID controller is set to zero responsive to an accumulated average lag time being less than the target lag time;
    obtaining a control value as an active processing time divided by a sum of the active processing time with an average active processing time;
    scaling, using the control value, the throttled rate limit to obtain a scaled throttled rate limit; and
    accepting subsequent events according to the scaled throttled rate limit, wherein accepting the subsequent events according to the scaled throttled rate limit results in a reduction in a number of events accepted for processing during a throttling period corresponding to the scaled throttled rate limit.

2. The method of claim 1, wherein the accumulated average lag time is calculated within a sliding window.

3. The method of claim 1,
wherein the accepted events correspond to at least two or more routing keys, and
wherein scaling, using the control value, the throttled rate limit to obtain the scaled throttled rate limit comprises:
scaling, using the control value, the throttled rate limit to obtain respective scaled throttled rate limits for the at least two or more routing keys.

4. The method of claim 3, wherein accepting the subsequent events according to the scaled throttled rate limit comprises:
accepting first subsequent events corresponding to a first routing key according to a first scaled throttled rate limit; and
accepting second subsequent events corresponding to a second routing key according to a second scaled throttled rate limit that is different from the first scaled throttled rate limit.

5. The method of claim 4, wherein the first subsequent events corresponding to the first routing key are accepted according to the first scaled throttled rate limit for a throttling duration.

6. The method of claim 3, scaling, using the control value, the throttled rate limit to obtain the respective scaled throttled rate limits for the at least two or more routing keys comprises:
scaling the throttled rate limit for a routing key based on a deviation amount of first processing time of events corresponding to the routing key from an average processing time of the accepted events.

7. The method of claim 6, wherein the throttled rate limit is scaled using a quadratic Bezier curve.

8. The method of claim 1, wherein obtaining the throttled rate limit using the PID controller comprises:
clamping the throttled rate limit to a value that is greater than or equal to 1 and less than or equal to the target rate limit.

9. The method of claim 1, further comprising:
responsive to determining that an accumulated pending processing time of in process events is greater than a maximum accumulated processing time, stopping acceptance of events.

10. An apparatus comprising:
a memory; and
a processor, the processor configured to execute instructions stored in the memory to:
process accepted events,
wherein the processor is configured to accept events for the processing at a target rate limit,
wherein the processor is configured to complete the processing of an event in no more than a target lag time, and
wherein the accepted events comprise first events associated with a first routing key and second events associated with a second routing key;
use a proportional-integral-derivative (PID) controller to obtain a throttled rate limit of the target rate limit, wherein the throttled rate limit is smaller than the target rate limit, and wherein accepting subsequent events according to the throttled rate limit causes the processor to reduce a number of events accepted for processing during a throttling period corresponding to the throttled rate limit;
obtain a control value as an active processing time divided by a sum of the active processing time with an average active processing time;
scale, using the control value, the throttled rate limit to obtain a first scaled throttled rate limit;
scale the throttled rate limit to obtain a second scaled throttled rate limit;
accept first subsequent events associated with the first routing key according to the first scaled throttled rate limit; and
accept second subsequent events associated with the second routing key according to the second scaled throttled rate limit.

11. The apparatus of claim 10, wherein the instructions further comprise:
responsive to a determination that an accumulated pending processing time of in process events is greater than a maximum accumulated processing time, stop accepting additional events for processing.

12. The apparatus of claim 10, wherein the throttled rate limit is scaled using a quadratic Bezier curve.

13. A non-transitory computer-readable storage medium, comprising executable instructions that, when executed by a processor, facilitate performance of operations, comprising:
accepting for processing, as accepted events and according to a target rate limit that indicates a maximum number of events to be accepted for processing, at least a subset of received events;
associating respective ingested timestamps with the accepted events, wherein an ingested timestamp of an accepted event indicates a time of accepting the accepted event for further processing;
associating respective processing completion timestamps with processed events of the accepted events;
determining an average measured lag time using at least a subset of the respective processing completion timestamps and corresponding respective ingested timestamps;
obtaining a throttled rate limit using a proportional-integral-derivative (PID) controller,
wherein the PID controller is configured to use, as an input, an error value that is a difference between a target lag time indicative of a desired time of processing events and the average measured lag time indicative of an average of actual times of processing events, and
wherein an integral part of the PID controller is set to zero responsive to an accumulated average lagtime being less than the target lagtime;
obtaining a control value as an active processing time divided by a sum of the active processing time with an average active processing time;
scaling, using the control value, the throttled rate limit to obtain a scaled throttled rate limit; and
accepting subsequent events according to the scaled throttled rate limit, wherein accepting the subsequent events according to the scaled throttled rate limit results in a reduction in a number of events accepted for processing during a throttling period corresponding to the scaled throttled rate limit.

14. The non-transitory computer-readable storage medium of claim 13, wherein the accumulated average lag time is calculated within a sliding window.

15. The non-transitory computer-readable storage medium of claim 13,
wherein the accepted events correspond to at least two or more routing keys, and
wherein scaling, using the control value, the throttled rate limit to obtain the scaled throttled rate limit comprises:
scaling, using the control value, the throttled rate limit to obtain respective scaled throttled rate limits for the at least two or more routing keys.

16. The non-transitory computer-readable storage medium of claim 15, wherein accepting the subsequent events according to the scaled throttled rate limit comprises:
accepting first subsequent events corresponding to a first routing key according to a first scaled throttled rate limit; and
accepting second subsequent events corresponding to a second routing key according to a second scaled throttled rate limit that is different from the first scaled throttled rate limit.

17. The non-transitory computer-readable storage medium of claim 16, wherein the first subsequent events corresponding to the first routing key are accepted according to the first scaled throttled rate limit for a throttling duration.

18. The non-transitory computer-readable storage medium of claim 15, scaling, using the control value, the throttled rate limit to obtain the respective scaled throttled rate limits for the at least two or more routing keys comprises:
scaling the throttled rate limit for a routing key based on a deviation amount of first processing time of events corresponding to the routing key from an average processing time of the accepted events.

19. The non-transitory computer-readable storage medium of claim 18, wherein the throttled rate limit is scaled using a quadratic Bezier curve.

20. The non-transitory computer-readable storage medium of claim 13, wherein obtaining the throttled rate limit using the PID controller comprises:
clamping the throttled rate limit to a value that is greater than or equal to 1 and less than or equal to the target rate limit.

* * * * *